United States Patent
Tozaki et al.

(10) Patent No.: US 8,092,333 B2
(45) Date of Patent: Jan. 10, 2012

(54) TORQUE TRANSMISSION STRUCTURE, TRACTION DRIVE TRANSMISSION DEVICE, AND STEERING DEVICE FOR VEHICLE

(75) Inventors: Yasuyoshi Tozaki, Nagasaki (JP); Takeshi Yoshimi, Nagasaki (JP); Akihiko Umeda, Nagasaki (JP); Hiroyuki Sonobe, Nagoya (JP); Isamu Shiotsu, Nagoya (JP); Takayoshi Hirayama, Nagoya (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 302 days.

(21) Appl. No.: 11/576,483

(22) PCT Filed: Feb. 23, 2006

(86) PCT No.: PCT/JP2006/303314
§ 371 (c)(1),
(2), (4) Date: Apr. 2, 2007

(87) PCT Pub. No.: WO2006/090796
PCT Pub. Date: Aug. 31, 2006

(65) Prior Publication Data
US 2009/0075775 A1   Mar. 19, 2009

(30) Foreign Application Priority Data

Feb. 24, 2005 (JP) ................. 2005-049729
Feb. 24, 2005 (JP) ................. 2005-049730
Aug. 12, 2005 (JP) ................. 2005-233963

(51) Int. Cl.
*F16H 13/06* (2006.01)
(52) U.S. Cl. ........................ 475/197; 475/190
(58) Field of Classification Search ............. 475/7, 185, 475/190, 193, 197, 221, 330
See application file for complete search history.

(56) References Cited

U.S. PATENT DOCUMENTS 3,490,311 A   1/1970   Okabe
(Continued)

FOREIGN PATENT DOCUMENTS

CN   86203254 U   7/1987
(Continued)

OTHER PUBLICATIONS

Machine Translation in English Language of Japanese Patent No. JP 11-72152 A, Otaki et al., Mar. 16, 1990.*
(Continued)

*Primary Examiner* — Justin Holmes
(74) *Attorney, Agent, or Firm* — Kanesaka Berner & Partners, LLP

(57) ABSTRACT

There is provided a compact and highly durable variable-speed traction drive transmission device. A traction drive transmission device which uses the traction of rolling bodies K arranged between an input shaft Si and an output shaft So to change the number of revolutions of the input shaft Si into a desired transmission ratio and output from the output shaft So, has a rotation axis of the rolling bodies K arranged at an incline so that it is not orthogonal to the axis of the input shaft Si and the output shaft So, and there is provided: a load regulation cam 50 which automatically changes a preload applied to the rolling bodies K corresponding to a torque of the input shaft Si; and a differential type transmission ratio variation mechanism using a worm gear 55, which is connected to a retainer 40 serving as a traction input-output member of the rolling bodies K, and performs number of revolutions control of the retainer 40 to change the transmission ratio.

5 Claims, 21 Drawing Sheets

U.S. PATENT DOCUMENTS

| | | | |
|---|---|---|---|
| 4,802,386 A * | 2/1989 | Haack | 475/197 |
| 4,846,008 A * | 7/1989 | Kraus | 475/194 |
| 5,649,897 A * | 7/1997 | Nakamura et al. | 600/111 |
| 7,111,716 B2 * | 9/2006 | Ekonen et al. | 192/20 |
| 2003/0094329 A1 * | 5/2003 | Ogawa et al. | 180/444 |
| 2005/0277514 A1 * | 12/2005 | Hiroyuki et al. | 475/331 |

FOREIGN PATENT DOCUMENTS

| | | |
|---|---|---|
| JP | 59-1955 U | 1/1984 |
| JP | 1-139161 U | 9/1989 |
| JP | HEI 1-1391561 | 9/1989 |
| JP | 06-288453 | 10/1994 |
| JP | 6-313468 A | 11/1994 |
| JP | 11-72152 A | 3/1999 |
| JP | 2002-293147 A | 10/2002 |
| JP | 2003-278866 | 10/2003 |
| JP | 2004-058896 | 2/2004 |
| JP | 2004-116670 | 4/2004 |
| JP | 2004-155244 A | 6/2004 |

OTHER PUBLICATIONS

Office Action issued for corresponding Chinese Patent Application No. 200680000600.1 on Dec. 6, 2010.

Office Action issued for corresponding Japanese Patent Application No. 2007-504781 on Dec. 14, 2010.

European Search Report dated May 29, 2011 from corresponding European Application No. 06714454.3.

* cited by examiner

TORQUE TRANSMISSION STRUCTURE, TRACTION DRIVE TRANSMISSION DEVICE, AND STEERING DEVICE FOR VEHICLE

CROSS-REFERENCE TO RELATED APPLICATIONS

The present Application is based on International Application No. PCT/JP2006/303314, filed on Feb. 23, 2006, which in turn corresponds to Japan Application Nos. 2005-049729, 2005-049730, 2005-233963, filed on Feb. 24, 2005, Feb. 24, 2005, Aug. 12, 2005, and priority is hereby claimed under 35 USC §119 based on these applications. Each of these applications are hereby incorporated by reference in their entirety into the present application.

TECHNICAL FIELD

The present invention relates to a torque transmission structure applied for example to a steering system of a vehicle, and to a traction drive transmission device and vehicle steering device which use this torque transmission structure.

BACKGROUND ART

Heretofore, there is known a traction drive transmission device which uses a tangential force which acts on a contact portion of a body of revolution which is in a rolling sliding state, to perform transmission of a torque having a transmission ratio between the number of revolutions of an input shaft and the number of revolution of an output shaft. In this traction drive transmission device, the input/output transmission ratio becomes a linear shape (for example refer to Patent Document 1).

Furthermore, as a transmission device in which linear shape stepless transmission is possible, there is know a planetary roller type transmission device (for example refer to Patent Document 2).

Moreover, there is known a vehicle steering device in which a reduction gear is arranged in a torque transmission path of a steering transmission system provided with a differential transmission mechanism which functions as a step-up gear, to thereby step-down the transmission ratio which has been stepped up, and finally return the transmission ratio of the overall steering system to, for example, 1:1 (for example refer to Patent Document 3).

Patent Document 1: Japanese Unexamined Patent Application, Publication No. 2003-278866
Patent Document 2: Japanese Unexamined Patent Application, Publication No. Hei 1-139161
Patent Document 3: Japanese Unexamined Patent Application, Publication No. 2004-58896

DISCLOSURE OF INVENTION

Incidentally, in the abovementioned conventional traction drive transmission device or planetary roller type transmission device, the transmission ratio of the input/output becomes a predetermined linear shape. Therefore, it is not possible to realize an optional transmission ratio which is different to the linear shape transmission ratio set beforehand in one transmission.

Furthermore, in the vehicle steering device in which the step-up gear and the reduction gear are arranged in the torque transmission system or the like, and the transmission ratio of the overall steering system is set to a desired value, when considering installation in a limited space as in a vehicle, since the step-up gear and the reduction gear are aligned on the same axis thus making it long in the axial direction, this gives rise to a problem from the aspect of making it compact.

From this background, it is desired to develop a compact and highly durable torque transmission structure, which can be used for example in the torque transmission route of a vehicle steering device, and which produces an axial pressing force which changes corresponding to the transmission torque.

Furthermore, it is desired to develop a compact and highly durable traction drive transmission device, which can freely change the transmission ratio between input and output shafts, and a vehicle steering device which uses this traction drive transmission device.

Moreover, it is desired to develop a compact and highly durable traction drive transmission device, which can freely change the transmission ratio between input and output shaft, and can increase the transmission torque of the output shaft, and a vehicle steering device which uses this traction drive transmission device.

The present invention takes into consideration the above situation, with an object of providing a compact and highly durable torque transmission structure, a compact and highly durable variable-speed traction drive transmission device, and a vehicle steering device which uses these.

Furthermore, an object of the present invention is to provide a compact and highly durable variable-speed traction drive transmission device which can freely change the transmission ratio between input and output shafts, and can increase the transmission torque of the output shaft, and a vehicle steering device which uses this.

The present invention adopts the following means for solving the above problems.

A torque transmission structure according to a first aspect of the present invention is one which, in a torque transmission structure which performs torque transmission between opposing faces of two members which are arranged so as to rotate on the same axis,
is characterized in that recesses which form an incline face or curved face in cross-section are provided in a plurality of sets between the opposing faces, and a load regulation cam is disposed in a space of the recesses.

According to such a torque transmission structure, since the recesses which form an incline face or curved face in cross-section, are provided in a plurality of sets between the opposing faces, and the load regulation cam is disposed in the space of the recesses, then by operation of a compact load regulation cam which is fitted between the opposing faces without substantially extending the axial length, an axial pressing force which changes corresponding to the transmission torque can be produced.

A traction drive transmission device according to a second aspect of the present invention is one which, in a traction drive transmission device which uses the traction of rolling bodies arranged between an input shaft and an output shaft to change the number of revolutions of the input shaft into a desired transmission ratio and output from the output shaft,
is characterized in that a rotation axis of the rolling bodies is arranged at an incline so that it is not orthogonal to the axis of the input shaft and the output shaft, and there is provided: a preload adjusting part which automatically changes a preload applied to the rolling bodies corresponding to a torque of the input shaft; and a differential type transmission ratio variation mechanism which is connected to a traction input-output member of the rolling bodies, and performs number of revolutions control of the traction input-output member to change the transmission ratio.

According to such a traction drive transmission device, since the rotation axis of the rolling bodies is arranged at an incline so that it is not orthogonal to the axis of the input shaft and the output shaft, and there is provided: the preload adjusting part which automatically changes the preload applied to the rolling bodies corresponding to the torque of the input shaft; and the differential type transmission ratio variation mechanism which is connected to the traction input-output member of the rolling bodies, and performs number of revolutions control of the traction input-output member to change the transmission ratio, the preload applied to the rolling bodies arranged at an incline is adjusted by the preload adjusting means corresponding to the torque of the input shaft. That is to say, the preload adjusting mechanism produces a thrust load corresponding to the transmission torque, and this thrust load becomes a preload which pushes the rolling bodies in the axial direction. Furthermore, since the differential type transmission ratio variation mechanism is provided, the transmission ratio of the input/output shafts can be adjusted and optionally set.

A third aspect of the present invention is characterized in that the traction drive transmission device of the second aspect is provided with a transmission torque assisting mechanism which applies a turning force to the output shaft to increase a transmission torque.

In this case, for the torque transmitted to the output shaft, a torque which is increased to a desired value by the operation of the transmission torque assisting mechanism is output.

A fourth aspect of the present invention is characterized in that in the traction drive transmission device according to either one of the second and third aspects, the rolling bodies which are disposed in a retainer are arranged between an inner ring provided with the input shaft, and an outer ring provided with the output shaft, and the preload adjusting part is provided on the inner ring, and together with this, the transmission ratio variation mechanism is connected to the retainer. As a result, the torque of the inner ring which becomes the input shaft is transmitted to the outer ring which becomes the output shaft via the rolling bodies disposed in a rolling body retaining portion. At this time, for the input shaft, the preload adjusting part adjusts the preload acting on the rolling bodies corresponding to the torque of the input shaft. Therefore, when there is no input torque, the preload can be kept to a minimum. Furthermore, the transmission ratio variation mechanism is connected to the retainer of a traction input-output member, and performs differential rotation control. Therefore, the transmission ratio of the input/output shafts can be changed. In the case where the transmission torque assisting mechanism is connected to the output shaft provided with the outer ring, the transmission torque of the output shaft is increased and torque of a large value is output.

A fifth aspect of the present invention is characterized in that in the traction drive transmission device according to either one of the second and third aspects, the rolling bodies disposed in a retainer provided with the output shaft are arranged between an inner ring provided with the input shaft, and an outer ring, and the preload adjusting part is provided on the retainer, and together with this, the transmission ratio variation mechanism is connected to the outer ring. As a result, the torque of the inner ring which becomes the input shaft is transmitted to the output shaft of the retainer via the rolling bodies disposed in a rolling body retaining portion. At this time, for the retainer which becomes the output shaft, the preload adjusting part adjusts the preload acting on the rolling bodies corresponding to the torque of the input shaft. Therefore, when there is no input torque, the preload can be kept to a minimum. Furthermore, the transmission ratio variation mechanism is connected to an outer ring of a traction input-output member, and performs differential rotation control. Therefore, the transmission ratio of the input/output shafts can be changed. In the case where the transmission torque assisting mechanism is connected to the output shaft provided with the retainer, the transmission torque of the output shaft is increased and torque of a large value is output.

A sixth aspect of the present invention is characterized in that in the traction drive transmission device according to the second aspect, the rolling bodies disposed in a retainer provided with the input shaft are arranged between an inner ring, and an outer ring provided with the output shaft, and the preload adjusting part is provided on the inner ring, and together with this, the transmission ratio variation mechanism is connected to the inner ring. As a result, the torque of the retainer which becomes the input shaft is transmitted to the outer ring which becomes the output shaft via the rolling bodies disposed in a rolling body retaining portion. At this time, for the inner ring, the preload adjusting means adjusts the preload acting on the rolling bodies corresponding to the torque of the input shaft. Therefore, when there is no input torque, the preload can be kept to a minimum. Furthermore, the transmission ratio variation mechanism is connected to an inner ring of a traction input-output member, and performs differential rotation control. Therefore, the transmission ratio of the input/output shafts can be changed.

In this case, by forming a gear portion on an outer peripheral face or a side face of the outer ring, and meshing with a rack gear, the rotation torque of the input shaft is converted to linear motion of the rack gear via the outer ring of the output shaft.

An eighth aspect of the present invention is characterized in that in the traction drive transmission device according to either one of the second and third aspects, the rolling bodies disposed in a retainer provided with the input shaft are arranged between an inner ring provided with the output shaft, and an outer ring, and the preload adjusting part is provided on the inner ring, and together with this, the transmission ratio variation mechanism is connected to the outer ring. As a result, the torque of the retainer which becomes the input shaft is transmitted to the inner ring which becomes the output shaft via the rolling bodies disposed in a rolling body retaining portion. At this time, for the inner ring, the preload adjusting part adjusts the preload acting on the rolling bodies corresponding to the torque of the input shaft. Therefore, when there is no input torque, the preload can be kept to a minimum. Furthermore, the transmission ratio variation mechanism is connected to an outer ring of a traction input-output member, and performs differential rotation control. Therefore, the transmission ratio of the input/output shafts can be changed. In the case where the transmission torque assisting mechanism is connected to the output shaft provided with the inner ring, the transmission torque of the output shaft is increased and torque of a large value is output.

A ninth aspect of the present invention is characterized in that in the traction drive transmission device according to the second aspect, the rolling bodies disposed in a retainer which becomes the output shaft are arranged between an inner ring and an outer ring provided with the input shaft, and the preload adjusting part is provided on the inner ring, and together with this, the transmission ratio variation mechanism is connected to the inner ring. As a result, the torque of the outer ring which becomes the input shaft is transmitted to the retainer which becomes the output shaft via the rolling bodies disposed in a rolling body retaining portion. At this time, for the inner ring, the preload adjusting part adjusts the preload acting on the rolling bodies corresponding to the torque of the input shaft. Therefore, when there is no input torque, the preload can be kept to a minimum. Furthermore, the transmission ratio variation mechanism is connected to an inner ring of a traction input-output member, and performs differential rotation control. Therefore, the transmission ratio of the input/output shafts can be changed.

In this case, by forming a gear portion on the outer peripheral face or the side face of the retainer, and meshing with a rack gear, the rotation torque of the input shaft is converted to linear motion of the rack gear via the retainer of the output shaft.

An eleventh aspect of the present invention is characterized in that in the traction drive transmission device according to either one of the second and third aspects, the rolling bodies disposed in a retainer are arranged between an inner ring provided with the output shaft and an outer ring provided with the input shaft, and the preload adjusting part is provided on the inner ring, and together with this, the transmission ratio variation mechanism is connected to the retainer. As a result, the torque of the outer ring which becomes the input shaft is transmitted to the inner ring which becomes the output shaft via the rolling bodies disposed in a rolling body retaining portion. At this time, for the outer ring, the preload adjusting part adjusts the preload acting on the rolling bodies corresponding to the torque of the input shaft. Therefore, when there is no input torque, the preload can be kept to a minimum. Furthermore, the transmission ratio variation mechanism is connected to a retainer of a traction input-output member, and performs differential rotation control. Therefore, the transmission ratio of the input/output shafts can be changed. In the case where the transmission torque assisting mechanism is connected to the output shaft provided with the inner ring, the transmission torque of the output shaft is increased and torque of a large value is output.

A traction drive transmission device according to the present invention is one which, in a traction drive transmission device which uses the traction of rolling bodies arranged between an input shaft and an output shaft to change the number of revolutions of the input shaft into a desired transmission ratio and output from the output shaft, and the input shaft and output shaft are connected in left/right symmetry to perform two stage transmission, is characterized in that a rotation axis of the rolling bodies is arranged at an incline so that it is not orthogonal to the axis of the input shaft and the output shaft, and there is provided: a preload adjusting part which automatically changes a preload applied to the rolling bodies corresponding to a torque between shafts which connect a first stage transmission section and a second stage transmission section; and a transmission ratio variation mechanism which is connected to a traction input-output member of the rolling bodies, and performs number of revolutions control of the traction input-output member to change the transmission ratio.

According to such a traction drive transmission device, since the rotation axis of the rolling bodies is arranged at an incline so that it is not orthogonal to the axis of the input shaft and the output shaft, and there is provided: the preload adjusting part which automatically changes the preload applied to the rolling bodies corresponding to the torque between the shafts which connect the first stage transmission section and the second stage transmission section; and the transmission ratio variation mechanism which is connected to the traction input-output member of the rolling bodies, and performs number of revolutions control of the traction input-output member to change the transmission ratio, the preload applied to the rolling bodies arranged at an incline is adjusted by the preload adjusting part which automatically changes the preload corresponding to the torque between the shafts which connect the first stage transmission section and the second stage transmission section. Furthermore, since the differential type transmission ratio variation mechanism is provided, the transmission ratio of the input/output shafts can be adjusted and optionally set. In this case, since the two stage transmission is performed by the first stage transmission section and the second stage transmission section, the input/output relationship for the traction drive can be made 1:1 in the same rotation direction.

A thirteenth aspect of the present invention is characterized in that the traction drive transmission device according to the twelfth aspect, is provided with a transmission torque assisting mechanism which applies a turning force to the output shaft to increase a transmission torque.

In this case, for the torque transmitted to the output shaft, a torque which is increased by a predetermined value by the operation of the transmission torque assisting mechanism is output.

A fourteenth aspect of the present invention is characterized in that the traction drive transmission device according to either one of the twelfth and thirteenth aspects comprises: a first stage transmission section with the rolling bodies which are disposed in a first retainer, arranged between a first inner ring provided with the input shaft, and a first outer ring provided with a connection output shaft; and a second stage transmission section with the rolling bodies which are disposed in a second retainer, arranged between a second inner ring provided with the output shaft, and a second outer ring provided with a connection input shaft, and the preload adjusting means is provided on a shaft connection portion of the connection output shaft and the connection input shaft, and together with this, the transmission ratio variation mechanism is connected to the first retainer, and the second retainer is fixed to a housing. As a result, in the first stage transmission, the torque of the first inner ring which becomes the input shaft is transmitted to the first outer ring which becomes the connection output shaft, via the rolling bodies which are disposed in the rolling body retaining portion of the first retainer.

Subsequently, in the second stage transmission section, the torque transmitted via the preload adjusting part, to the second inner ring which becomes the connection input shaft, is transmitted to the second inner ring which becomes the output shaft, via the rolling bodies disposed in the rolling body retaining portion of the second retainer.

At this time, in the shaft connection portion, the preload adjusting part adjusts the preload acting on the rolling bodies of the first stage transmission section and the second stage transmission section, corresponding to the torque of the connection output shaft. Therefore, when there is no input torque, the preload can be suppressed to a minimum. Furthermore, the transmission ratio variation mechanism is connected to the retainer of the traction input-output member, and performs differential rotation control. Therefore, the transmission ratio of the input/output shafts can be changed. In the case where the transmission torque assisting mechanism is connected to the output shaft provided with the second inner ring, the transmission torque of the output shaft is increased and torque of a large value is output.

A fifteenth aspect of the present invention is characterized in that the traction drive transmission device according to either one of the twelfth and thirteenth aspects comprises: a first stage transmission section with the rolling bodies which are disposed in a first retainer furnished with a connection output shaft, arranged between a first inner ring provided with the input shaft, and a first outer ring; and a second stage transmission section with the rolling bodies which are disposed in a second retainer furnished with a connection input shaft, arranged between a second inner ring provided with the output shaft, and a second outer ring, and the preload adjusting part is provided on a shaft connection portion of the connection output shaft and the connection input shaft, and together with this, the transmission ratio variation mechanism is connected to the first outer ring, and the second outer ring is fixed to a housing. As a result, in the first stage transmission, the torque of the first inner ring which becomes the input shaft is transmitted to the first retainer which becomes the connection output shaft, via the rolling bodies which are disposed in the rolling body retaining portion of the first retainer.

Subsequently, in the second stage transmission section, the torque transmitted via the preload adjusting part, to the second retainer which becomes the connection input shaft, is transmitted to the second inner ring which becomes the output shaft, via the rolling bodies disposed in the rolling body retaining portion of the second retainer. At this time, in the shaft connection portion, the preload adjusting part adjusts the preload acting on the rolling bodies of the first stage transmission section and the second stage transmission section, corresponding to the torque of the connection output shaft. Therefore, when there is no input torque, the preload can be suppressed to a minimum. Furthermore, the transmission ratio variation mechanism is connected to the outer ring of the traction input-output member, and performs differential rotation control. Therefore, the transmission ratio of the input/output shafts can be changed. In the case where the transmission torque assisting mechanism is connected to the output shaft provided with the second inner ring, the transmission torque of the output shaft is increased and torque of a large value is output.

A sixteenth aspect of the present invention is characterized in that the traction drive transmission device according to either one of the twelfth and thirteenth aspects comprises: a first stage transmission section with the rolling bodies which are disposed in a first retainer furnished with the input shaft, arranged between a first inner ring provided with the connection output shaft, and a first outer ring; and a second stage transmission section with the rolling bodies which are disposed in a second retainer furnished with the output shaft, arranged between a second inner ring provided with a connection input shaft, and a second outer ring, and the preload adjusting part is provided on a shaft connection portion of the connection output shaft and the connection input shaft, and together with this, the transmission ratio variation mechanism is connected to the first outer ring, and the second outer ring is fixed to a housing. As a result, in the first stage transmission, the torque of the first retainer which becomes the input shaft is transmitted to the first inner ring which becomes the connection output shaft, via the rolling bodies which are disposed in the rolling body retaining portion of the first retainer.

Subsequently, in the second stage transmission section, the torque transmitted via the preload adjusting part, to the second inner ring which becomes the connection input shaft, is transmitted to the second retainer which becomes the output shaft, via the rolling bodies disposed in the rolling body retaining portion of the second retainer. At this time, in the shaft connection portion, the preload adjusting part adjusts the preload acting on the rolling bodies of the first stage transmission section and the second stage transmission section, corresponding to the torque of the connection output shaft. Therefore, when there is no input torque, the preload can be suppressed to a minimum. Furthermore, the transmission ratio variation mechanism is connected to the outer ring of the traction input-output member, and performs differential rotation control. Therefore, the transmission ratio of the input/output shafts can be changed. In the case where the transmission torque assisting mechanism is connected to the output shaft provided with the second retainer, the transmission torque of the output shaft is increased and torque of a large value is output.

A seventeenth aspect of the present invention is characterized in that the traction drive transmission device according to either one of the twelfth and thirteenth aspects comprises: a first stage transmission section with the rolling bodies which are disposed in a first retainer, arranged between a first inner ring provided with a connection output shaft, and a first outer ring provided with the input shaft; and a second stage transmission section with the rolling bodies which are disposed in a second retainer, arranged between a second inner ring provided with a connection input shaft, and a second outer ring provided with the output shaft, and the preload adjusting part is provided on a shaft connection portion of the connection output shaft and the connection input shaft, and together with this, the transmission ratio variation mechanism is connected to the first retainer, and the second retainer is fixed to a housing. As a result, in the first stage transmission, the torque of the first outer ring which becomes the input shaft is transmitted to the first inner ring which becomes the connection output shaft, via the rolling bodies which are disposed in the rolling body retaining portion of the first retainer.

Subsequently, in the second stage transmission section, the torque transmitted via the preload adjusting part, to the second inner ring which becomes the connection input shaft, is transmitted to the second outer ring which becomes the output shaft, via the rolling bodies disposed in the rolling body retaining portion of the second retainer. At this time, in the shaft connection portion, the preload adjusting part adjusts the preload acting on the rolling bodies of the first stage transmission section and the second stage transmission section, corresponding to the torque of the connection output shaft. Therefore, when there is no input torque, the preload can be suppressed to a minimum. Furthermore, the transmission ratio variation mechanism is connected to the retainer of the traction input-output member, and performs differential rotation control. Therefore, the transmission ratio of the input/output shafts can be changed. In the case where the transmission torque assisting mechanism is connected to the output shaft provided with the second outer ring, the transmission torque of the output shaft is increased and torque of a large value is output.

A traction drive transmission device according to the present invention is one which, in a traction drive transmission device which uses the traction of rolling bodies arranged between an input shaft and an output shaft to change the number of revolutions of the input shaft into a desired transmission ratio and output from the output shaft, and the input shaft and output shaft are connected to perform two stage transmission, is characterized in that a rotation axis of the rolling bodies is arranged at an incline so that it is not orthogonal to the axis of the input shaft and the output shaft, and there is provided: a preload adjusting part which automatically changes a preload applied to the rolling bodies corresponding to a torque between shafts which connect a first stage transmission section and a second stage transmission section; and a transmission ratio variation mechanism which is connected to a traction input-output member of the rolling bodies, and performs number of revolutions control of the traction input-output member to change the transmission ratio, and traction input-output members of the first stage transmission section and the second stage transmission section are connected and integrated, and together with this, a difference is provided in the transmission ratio of the two transmission sections.

According to such a traction drive transmission device, since the rotation axis of the rolling bodies is arranged at an incline so that it is not orthogonal to the axis of the input shaft and the output shaft, and there is provided: the preload adjusting part which automatically changes the preload applied to the rolling bodies corresponding to the torque between the shafts which connect the first stage transmission section and the second stage transmission section; and the transmission ratio variation mechanism which is connected to the traction input-output member of the rolling bodies, and performs number of revolutions control of the traction input-output member to change the transmission ratio, and the traction input-output members of the first stage transmission section and the second stage transmission section are connected and integrated, and together with this, a difference is provided in the transmission ratio of the two transmission sections, the preload applied to the rolling bodies arranged at an incline is adjusted by the preload adjusting part which automatically changes the preload corresponding to the torque between the shafts which connect the first stage transmission section and the second stage transmission section. Furthermore, since two stage transmission is performed by the first stage transmission section and the second stage transmission section, and the traction input-output members of the two transmission sections are connected and integrated, and a difference is provided in the transmission ratio, the transmission ratio of the input/output shafts can be adjusted and optionally set by the differential type transmission ratio variation mechanism. Moreover, the input/output relationship for the traction drive can be made 1:1 in the same rotation direction.

A nineteenth aspect of the present invention is characterized in that the traction drive transmission device according to the eighteenth aspect comprises: a first stage transmission section with the rolling bodies which are disposed in a first retainer furnished with the input shaft, arranged between a first inner ring provided with a connection output shaft, and an outer ring connection member; and a second stage transmission section with the rolling bodies which are disposed in a second retainer furnished with the output shaft, arranged between a second inner ring provided with a connection input shaft, and the outer ring connection member, and the preload adjusting part is provided on a shaft connection portion of the connection output shaft and the connection input shaft, and together with this, the transmission ratio variation mechanism is connected to the outer ring connection member. As a result, in the first stage transmission, the torque of the first retainer which becomes the input shaft is transmitted to the first inner ring which becomes the connection output shaft, via the rolling bodies which are disposed in the rolling body retaining portion of the first retainer. Subsequently, in the second stage transmission section, the torque transmitted via the preload adjusting part, to the second inner ring which becomes the connection input shaft, is transmitted to the second retainer which becomes the output shaft, via the rolling bodies disposed in the rolling body retaining portion of the second retainer. At this time, in the shaft connection portion, the preload adjusting part adjusts the preload acting on the rolling bodies of the first stage transmission section and the second stage transmission section, corresponding to the torque of the connection output shaft. Therefore, when there is no input torque, the preload can be suppressed to a minimum. Furthermore, since a difference is provided in the transmission ratio in the two transmission sections, then by connecting the transmission ratio variation mechanism to the outer ring connection member, and performing differential rotation control, the transmission ratio of the input/output shafts can be changed In a twentieth aspect of the present invention, in the traction drive transmission device of any one of the second to nineteenth aspects, preferably the preload adjusting part is one where, in a torque transmission structure which performs torque transmission between opposing faces of two members which are arranged so as to rotate on the same axis, recesses which form an incline face or curved face in cross-section are provided in a plurality of sets between the opposing faces, and a load regulation cam is disposed in a space of the recesses.

In a twenty first aspect of the present invention, in the traction drive transmission device of any one of the second to twenty first aspects, preferably the transmission ratio variation mechanism is a worm gear which is furnished with a drive source capable of rotation control. This worm gear has a fail safe mechanism for the case where an input is input from the output shaft side.

In a twenty second aspect of the present invention, in the traction drive transmission device of any one of the second to twenty first aspects, preferably the transmission ratio variation mechanism is a planetary type reduction gear with a hollow motor as a drive source, with the input shaft and the output shaft arranged on the same axis. As a result the outer diameter dimensions of the device can be made smaller.

In a twenty third aspect of the present invention, in the traction drive transmission device of any one of the third to fifth, the eleventh, the thirteenth to seventeenth, and the twentieth to twenty second aspects, preferably the transmission torque assisting mechanism is a worm gear furnished with an electric driving part which is easily controlled.

A steering device for a vehicle according to the present invention is characterized in that a steering operation of a driver is transmitted to a vehicle steering wheel via a traction drive transmission device according to any one of the second to twenty third aspects.

According to such a vehicle steering device, regarding the torque of a steering shaft produced by steering, since the preloaded acting on the rolling bodies is adjusted by the preload adjusting part, the preload is changed from a minimum preload where steering torque is not produced such as during straight line travel, to a large preload for the case when performing sudden steering. Therefore, the situation where a large preload acts continuously on the rolling bodies can be prevented. Furthermore, the transmission ratio variation mechanism is connected to the retainer of a traction input-output member, and performs differential rotation control. Therefore, the transmission ratio of the input/output shafts can be changed. Moreover, if a single stage traction drive transmission device is employed, the shaft length can be shortened, and if a two stage traction drive transmission device is employed, the input/output relationship can be made 1:1 in the same rotation direction.

Furthermore, in the case where this is furnished with a transmission torque assisting mechanism which applies a transmission torque to the output shaft, then due to the increase in transmission torque output from the output shaft, the steering operating force of the driver can be lightened.

According to the present invention as described above, by having the construction where the load regulation cam is arranged between the plurality of recess portions which form an incline face or curved face in cross-section, provided between opposing faces of the two members which rotate on the same axis, the torque can be transmitted from the primary side (input side) member to the secondary side (output side) member via the load regulation cam, and together with this, the axial pressing force (thrust load) which acts from the primary side member to the secondary side member corresponding to the transmission torque is changed, and a torque transmission structure which is compact and short in the axial direction can be provided.

In a traction drive transmission device which adopts the above described torque transmission mechanism, the preload (axial pressing force) acting on the rolling bodies of the traction drive can be changed corresponding to the transmission torque between the input and output shafts. Therefore in a traction drive transmission device which changes the transmission torque between input and output shafts, a large preload does not act continuously on the rolling bodies. Consequently, the life of the rolling bodies can be improved. As a result in a traction drive transmission device which performs torque transmission from an input shaft to an output shaft via rolling bodies, the life of the rolling bodies is improved so that a remarkable effect is obtained where the reliability and durability is improved.

Moreover, since a differential type transmission ratio variation mechanism is provided, then by controlling the transmission ratio variation mechanism, an optional transmission ratio can be obtained between the input shaft and the output shaft. In particular, if a planetary type reduction gear with a hollow motor as a drive source, with the input shaft and the output shaft arranged on the same axis, is adopted, it is possible to provide a traction drive transmission device with small outer diameter dimensions.

Moreover in the case where a transmission torque assisting mechanism which applies a transmission torque to the output shaft is provided, the transmission torque output from the output shaft can be increased to a desired value and output.

Furthermore in a vehicle steering device furnished with the above described traction drive transmission device, when the driver is not steering such as when stopped or traveling straight ahead, the preload acting on the rolling bodies is a minimum. Moreover, a preload which changes corresponding to the torque change on the input shaft (steering shaft) side produced corresponding to the steering, acts on the rolling bodies. Therefore the device can be made compact, and the life of the rolling bodies is improved so that a remarkable effect is obtained where the reliability and durability of the steering device is improved. In particular, in a traction drive transmission device with small outer diameter dimensions which adopts a planetary type reduction gear with a hollow motor as a drive source, with the input shaft and the output shaft arranged on the same axis, it is possible to provide a vehicle steering device applicable to a strict installation environment where installation space is limited.

Moreover, since a differential type transmission ratio variation mechanism is provided, the transmission ratio between the input and output shafts can be optionally changed. Consequently, an optimum transmission ratio corresponding to the steering conditions can be appropriately set. More specifically, if the transmission ratio variation mechanism is controlled to set an optional transmission ratio, such as to increase the transmission ratio at the time of steering such as when parking in a line, to obtain a large steering angle for a small steering amount, and to reduce the steering transmission ratio at the time of steering such as during high speed travelling, to improve straight line traveling ability, the steering ability of the steering device can be improved.

Moreover, in the case where a transmission torque assisting mechanism is provided which applies a transmission torque to the output shaft, then for the transmission torque output from the output shaft, a torque which is increased to a desired value can be output. Consequently, a vehicle steering device for which the steering operating force of the driver is lightened and the steering ability is improved can be provided.

BRIEF DESCRIPTION OF DRAWINGS

FIG. 6

BEST MODE FOR CARRYING OUT THE INVENTION

Hereunder is a description of embodiments of a torque transmission structure, a traction drive transmission device, and a steering device for a vehicle according to the present invention, based on the drawings.

First Embodiment

Figure 1:
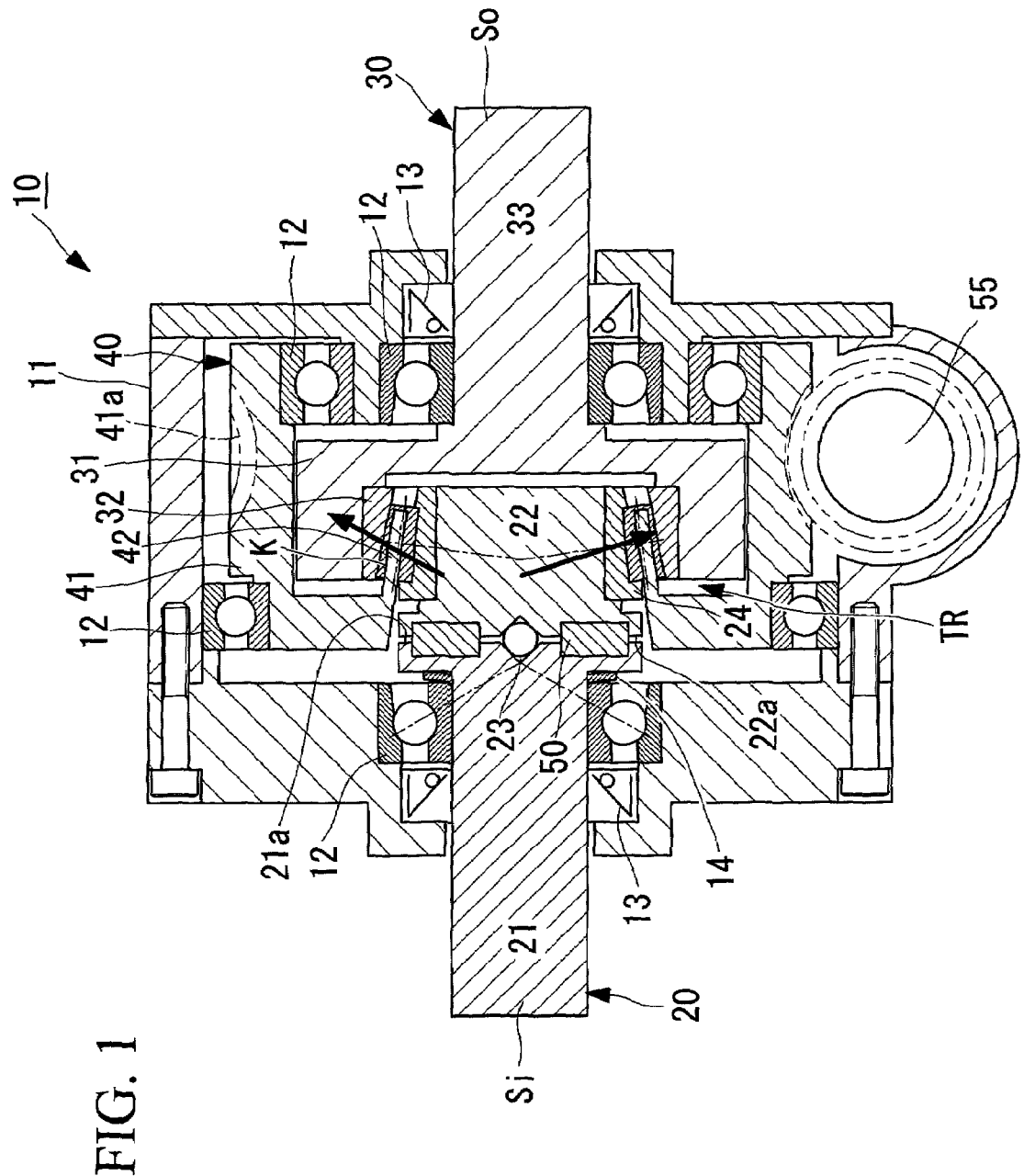
FIG. 1 is a cross-section view showing a first embodiment of a traction drive transmission device according to the present invention.

FIG. 1 is a cross-section showing a first embodiment of a traction drive transmission device according to the present invention. This traction drive transmission device (hereunder referred to as a transmission device) 10 has a function for using the traction of rolling bodies K arranged between an input shaft Si and an output shaft So, to change the number of revolutions of the input shaft Si into a desired transmission ratio, and output from the output shaft So.

Traction is the tangential force which acts on the contact portion of the rolling bodies K multiply arranged as bodies of revolution in a rolling and sliding state. In the example in the figure, a traction drive mechanism TR is constituted by a plurality of rolling bodies K which are retained in a retainer 40 and arranged between an inner ring 20 fitted with the input shaft Si, and an outer ring 30 fitted with the output shaft So. In this traction drive mechanism TR, due to the rheological properties of an oil film which is formed on the contact surfaces of the inner ring 20, and the outer ring 30, and the rolling bodies K, a torque can be transmitted from the inner ring 20 to the outer ring 30 via the rolling bodies K. At the time of this torque transmission, the rolling bodies K orbit around the outside of the inner ring 20 while rotating on their axes.

The traction drive mechanism TR is housed inside a housing 11 of the transmission device 10, and the input shaft Si and the output shaft So which are arranged on the same axis, protrude to the outside from opposite end portions of the housing 11.

The inner ring 20 is of a two piece construction, and in order to perform torque transmission between opposing faces of two members which are arranged so as to rotate on the same axis, there is provided a load regulation cam 50. That is to say, the inner ring 20 is divided into an input shaft portion 21 and an inner ring portion 22, and between opposing faces 21a and 22a of the input shaft portion 21 and the inner ring portion 22 are provided a plurality of sets of recess portions 23 for positioning a load regulation cam 50 of cylindrical shape. These recess portions 23 are spaces which are formed by pairs of grooves formed as sets respectively provided at symmetrical positions of the opposing faces 21a and 22a, and the load regulation cam 50 is accommodated inside these space in a condition where it can roll and slide thereinside. These recess portions 23 are provided as a plurality of sets radiating from the axial center so as to have the same pitch around the circumferential direction. The number thereof may be appropriately selected corresponding to various conditions. In the example shown in the figure, four sets of recess portions 23 are provided at a 90 degree pitch around the circumferential direction. The respective recess portions 23 are at positions provided with an appropriate separation from the axial center to avoid mutual interference of the load regulation cam 50.

Furthermore, the recess portions 23 have a cross-section shape formed as an inclined or curved face. In the example shown in the figure, a structure is provided where each of the cross-sections are made isosceles triangles on the opposing faces 21a and 22a, and by overlapping opposing pairs of grooves, recess portions 23 of rectangular cross-section shape are formed. The grooves forming the recess portions 23 need not necessarily be provided in symmetrical positions in the opposing faces 21a and 22a, provided that a groove can be formed between the opposing faces.

Furthermore, regarding the inner ring 20, the input shaft portion 21 is rotatably supported in the housing 11 via a bearing 12. On the input shaft portion 21 which protrudes to the outside of the housing 11 is connected a torque generating source (not shown in the figure). Reference symbol 13 in the figure denotes an O-ring, 14 denotes a plate spring which presses the input shaft 21 in the axial direction, and 24 denotes an inside ring member which is securely fixed to the outer peripheral face of the inner ring portion 22.

As a result, when the input shaft portion 21 receives an input, the load regulation cam 50 of cylindrical shape arranged in the recess portions 23, generates a force which presses the inner ring portion 22 in the axial direction due to the wedging effect, that is to say, a thrust load. This thrust load is one which changes corresponding to the magnitude of the shaft torque input to the input shaft portion 21. Consequently, the construction where the two members of the input shaft portion 21 and the inner ring portion 22 which are arranged so as to rotate on the same axis, form a plurality of recess portions 23 between the opposing faces, and the load regulation cam 50 is arranged in these recess portions 23 to perform torque transmission, gives a torque transmission structure where the thrust load acting on the inner ring portion 22 changes corresponding to variations in the torque input to the input shaft portion 21. Such a torque transmission structure is one where the load regulation cam 50 of cylindrical shape is arranged between the opposing faces 21a and 22a, and hence becomes a torque transmission structure which can keep axial lengthening to a minimum. Such a torque transmission structure functions as a preload adjustment device which automatically changes the preload applied to the rolling bodies K corresponding to the torque of the input shaft Si.

The retainer 40 comprises a comb shaped rolling body retaining portion 42 provided on the inner periphery of an approximate ring shaped main body 41. The main body 41 is a member which is rotatably supported on the housing 11 via a pair of bearings 12. The rolling bodies K disposed in the rolling body retaining portion 42, are tapered rollers which are retained in the comb portion so as to be freely rotatable. Their rotation axes are inclined so as not to be orthogonal to the axis of the input shaft Si and the output shaft So. Regarding these rolling bodies K, the inside ring member 24 which rotatably supports their faces on the inner peripheral side, and an outside ring member 32 which rotatably supports their faces on the outer peripheral side and which is securely fixed to an outer ring portion 31 of an outer ring 30 to be described later, constitute a tapered roller bearing in which the rolling bodies K can orbit while rotating about their axes between both ring members 24 and 32.

In this tapered roller bearing, a thin oil film is formed on the contact surfaces of the rolling bodies K and the inside ring member 24, and the rolling bodies K and the outside ring member 32, and torque transmission is performed by traction drive. Concerning the rolling body retaining portion 42 which retains the rolling bodies K, this is not limited to the above comb shape, and may be various shapes such as a ladder shape.

The outer ring 30 is a member in which the outer ring portion 31 and the outer ring 30 are as one. An output shaft portion 33 is rotatably supported on the housing 11 via a bearing 12. The output shaft portion 33 which protrudes to the outside of the housing 11, is connected to a device on the driven side such as with a rack and pinion of a vehicle steering gear (not shown in the figure).

Furthermore, the outer ring portion 33, is an approximate ring shape section with one end open. On the inner peripheral side thereof, is securely fixed the outside ring member 32 which constitutes the aforementioned tapered roller bearing.

The abovementioned retainer 40 is furnished with a gear portion 41a formed on the outer peripheral face of the main body 41. This gear portion 41a is meshed with a worm gear 55 which functions as a transmission ratio variation mechanism. The worm gear 55 is provided with a drive source such as an electric motor (not shown in the figure), and can be variably controlled to a desired number of revolutions. That is to say, by controlling the number of revolutions of the worm gear 55, the number of revolutions of the retainer 40 which rotates as one with the orbiting of the rolling bodies K which constitute the tapered roller bearing, is changed. Therefore this gives a transmission ratio variation mechanism of a differential type which changes the transmission ratio between the input shaft Si and the output shaft So. In other words, since the retainer 40 is a constituent component of the traction drive mechanism TR which performs torque transmission by means of traction, then if the worm gear 55 is connected to the retainer 40 which is a traction input-output member which the rolling bodies K drive by receiving influence of the traction, and the number of revolutions is controlled, this gives a transmission ratio variation mechanism of a differential type in which the transmission ratio is changed.

In the transmission device 10 constructed in this manner, when there is no input of torque to the input shaft Si, then for the axial pressing force, there is only the urging force received from the plate spring 14, and the preload applied to the rolling bodies K due to this urging force (shown by the arrow in the figure) becomes a minimum value. Regarding this preload, since the rotation axis of the rolling bodies K is inclined so as not to be orthogonal to the axis of the input shaft Si and the output shaft So, the axial direction pressing force is a component of the force which acts on the contact face. The urging force of the plate spring 14 is necessary to prevent movement of the input shaft Si and the like in the axial direction, or to retain the load regulation cam 50 within the recess portions 23.

When the input shaft Si receives a torque, the load regulation cam 50 between the opposing faces 21a and 22a exhibits a preload adjusting function for changing the preload corresponding to the input torque. Therefore the preload applied to the rolling bodies K from the inner ring portion 22 is increased in proportion to the torque. As a result, due to the traction between the inside ring member 24 securely fixed to the inner ring portion 22, and the rolling bodies K, the rolling bodies K orbit around the outside of the inner ring portion 22 as one with the retainer 40, while rotating about their axes. Furthermore, due to the traction between the rolling bodies K and the outside ring member 32 securely fixed to the outer ring portion 31, the torque is transmitted to the outer ring portion 31 so that the output shaft So rotates. In this case, the rotation direction of the output shaft So is the opposite direction to that of the input shaft Si.

At this time, by rotating the worm gear 55 at a desired number of revolutions, the number of revolutions of the meshed retainer 40, that is to say, the orbital number of revolutions of the rolling bodies K, is influenced and changes. Therefore the number of revolutions of the output shaft So which rotates due to the traction with the rolling bodies K, is also similarly influenced and changes.

Consequently, in the case where the number of revolutions of the input shaft Si is output from the output shaft So via the traction drive mechanism TR which is connected to the worm gear 55 for which variable control of the number of revolutions is possible, a desired transmission ratio which changes corresponding to the number of revolutions of the worm gear 55 can be obtained. That is to say, the transmission ratio between the input/output shafts, is not a linear shape, and can be selected and set to an optional transmission ratio within a predetermined range.

Furthermore, regarding the preload acting on the rolling bodies K, in the case where there is no input of torque to the input shaft Si, this becomes a minimum value attributable to the urging of the plate spring 14. Therefore there is no longer the situation where the large preload generated at the time of torque transmission continually acts on the rolling bodies K. Consequently, the life of the rolling bodies K can be improved.

Moreover, since the aforementioned preload adjustment can be achieved by the structure where the load regulation cam 50 of cylindrical shape members is provided between the input shaft portion 21 and the inner ring portion 22, the transmission device 10 becomes a compact structure which is not enlarged by lengthening in the axial direction.

Furthermore, regarding the transmission device 10 of the abovementioned structure, since the number of necessary bearings can be kept comparatively small, assembly at the time of construction is simplified. Moreover, when compared under the same conditions, this can operate in a range where the number of revolutions of the worm gear 55 is relatively low. Therefore the operating noise can be kept down. Furthermore, the bearing force on the rolling bodies K can be kept comparatively low, and also the transmission torque of the input shaft Si provided with the load regulation cam 50 can be set relatively low. Therefore this is advantageous from the aspect of life and durability.

Figure 2:
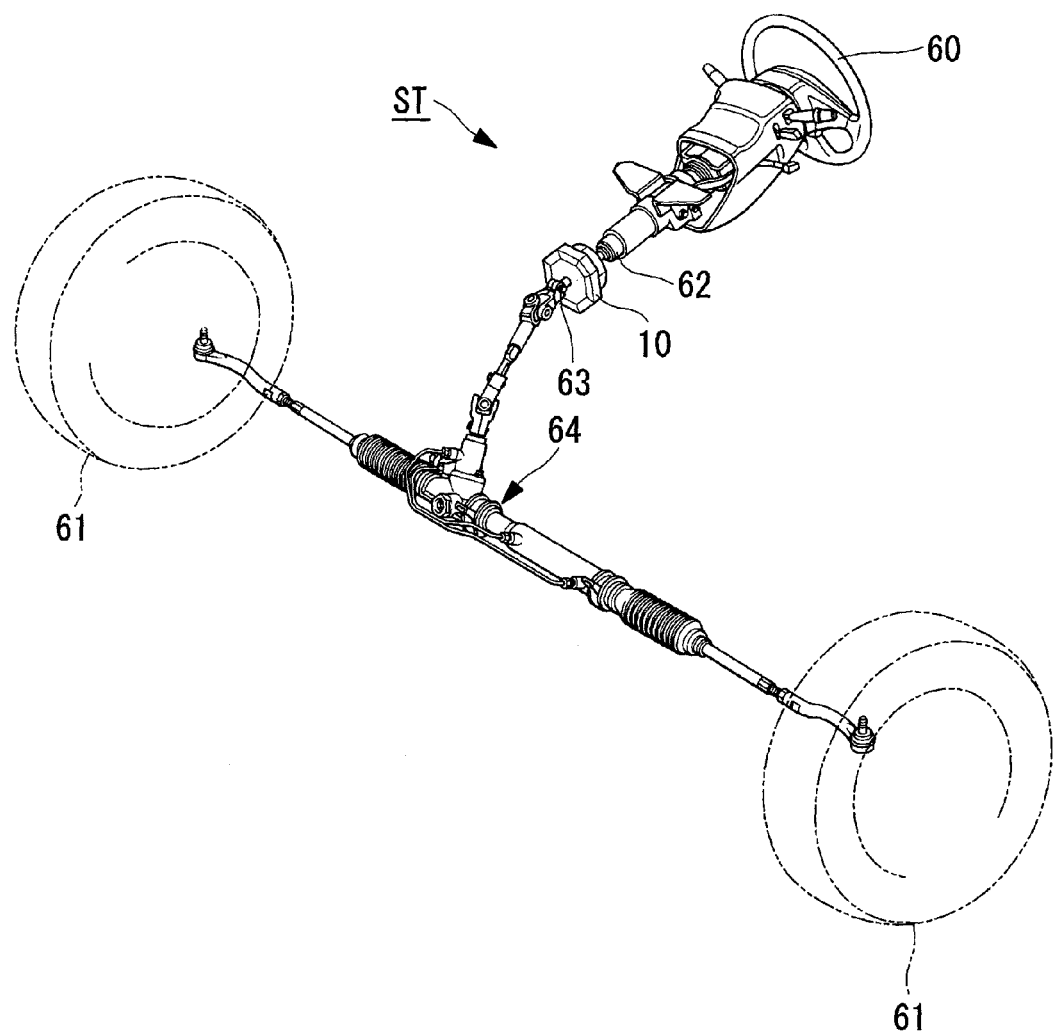
FIG. 2 is a perspective view showing a schematic configuration example of a vehicle steering device incorporating the traction drive transmission device of FIG. 1.

FIG. 2 is a perspective view schematically showing a vehicle steering device ST as an application example of the abovementioned transmission device 10.

The vehicle steering device ST is a device for changing the traveling direction of a vehicle. By a steering operation to turn a handle 60, the direction of steering wheels 61 can be changed. In the operation of the handle 60, rotation torque of an upper steering shaft 62 is input to the transmission device 10, and torque of an output which has been changed in the transmission device 10 drives a rack and pinion device 64 connected to a lower steering shaft 63. As a result, a link mechanism (not shown in the figure) connected to the rack and pinion device 64 operates together with the rack, so that the direction of the steering wheels 61 can be changed to a desired direction.

In such a vehicle steering device ST, the upper steering shaft 62 is connected to the input shaft Si of the transmission device 10, and the lower steering shaft 63 is connected to the output shaft So of the transmission device 10.

Therefore, when performing the steering operation, the torque generated by the operation of the handle 60 is transmitted from the upper steering shaft 62 to the input shaft Si, and a torque which has been changed into a desired transmission ratio inside the transmission device 10, is transmitted from the output shaft So to the lower steering shaft 63 so that the rack and pinion device 64 can be operated.

Consequently, in the case where the handle 60 is not operated, for example when stopped, or when travelling straight ahead, there is no torque on the upper steering shaft 62 and the input shaft Si, and hence the preload acting on the rolling bodies K becomes a minimum. Therefore, the life of the rolling bodies K is improved, which is effective for improving the durability and reliability of the vehicle steering device ST.

Furthermore, in the case where the operating amount of the handle 60 during low speed travel is large, such as when parking in a line, when the number of revolutions of the worm gear 55 is controlled to increase the transmission ratio, a large steering angle can be obtained with a small handle operating amount. That is to say, if the number of revolutions of the worm gear 55 is adjusted so that the number of revolutions of the input shaft Si is greatly increased in value and output from the output shaft So, then a small handle operation amount (the number of revolutions of the upper steering shaft 62) is increased in value and output to the lower steering shaft 63. Therefore the rack movement amount of the rack and pinion device 64 is increased, and the direction of the steering wheels 61 can be greatly changed. Therefore the operability of the vehicle steering apparatus ST is improved.

Figure 3:
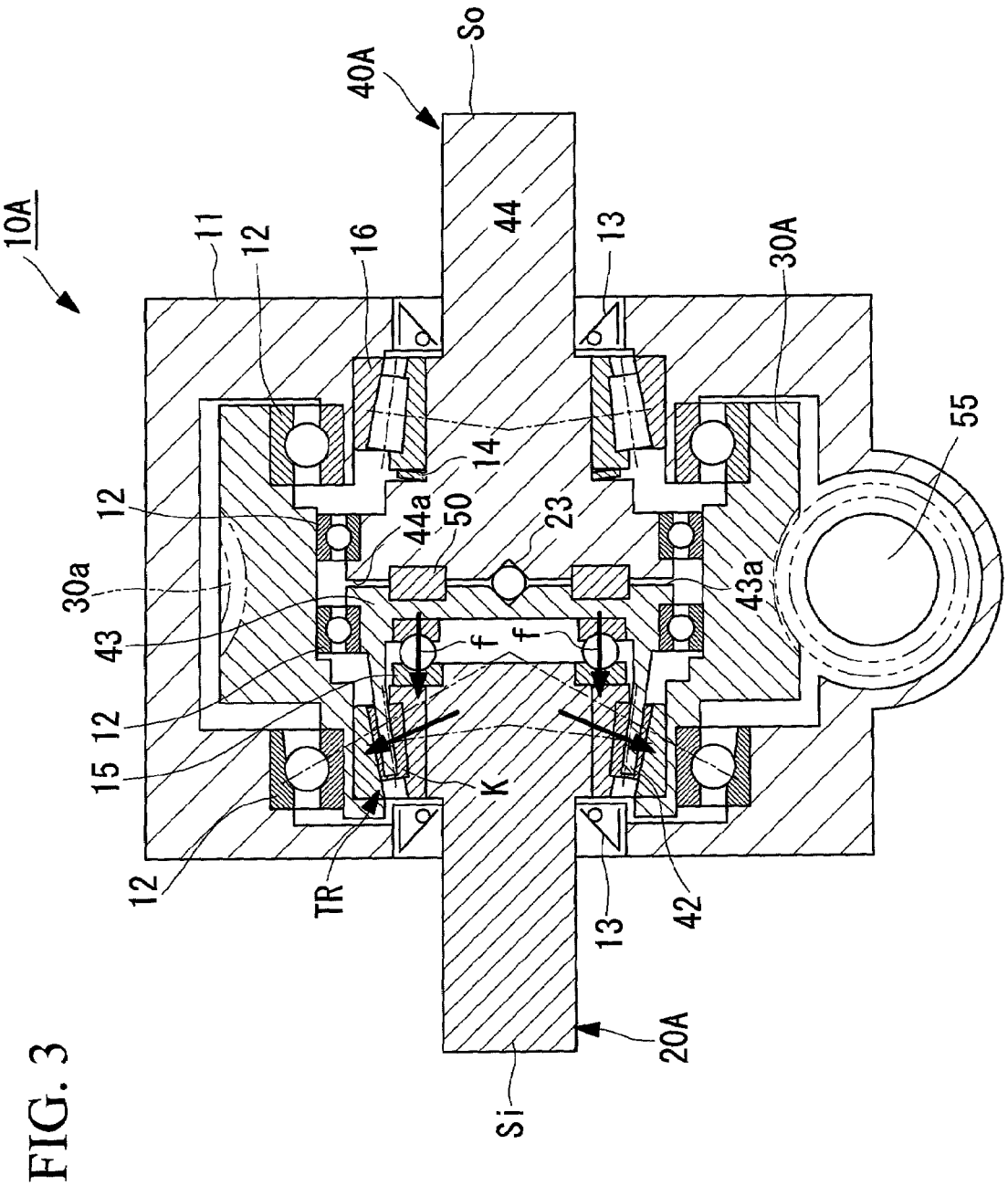
FIG. 3 is cross-section showing a first modified example of the traction drive transmission device of FIG. 1.

Next is a description of a first modified example of the transmission device according to the first embodiment, based on FIG. 3. Components the same as for the above-mentioned embodiment are denoted by the same reference symbols, and their detailed description is omitted.

In a transmission device 10A described by this modified example, the point where this is different to the aforementioned embodiment is that an inner ring 20A provided with the input shaft Si is integrally constructed, a retainer 40A provided with the output shaft So is of a two piece construction, with the load regulation cam 50 arranged between the matching faces, and the worm gear 55 of the transmission ratio variation mechanism is connected to an outer ring 30A.

That is to say, the retainer 40A furnished with the output shaft So, is of a two piece construction with a retainer main body 43 and an output shaft portion 44 separated, and tapered roller rolling bodies K are provided in a comb shape rolling body retaining portion 42 provided on the retainer main body 43. Furthermore, the load regulation cam 50 which functions as the aforementioned preload adjusting part, is arranged between the opposing faces 43a and 44a of the retainer main body 43 and the output shaft portion 44.

Moreover, the rolling bodies K are arranged between the inner ring 20 provided with the input shaft Si, and an outer ring 30A, so that a preload (shown by the arrow in the figure) acts, and torque transmission is performed by traction. Furthermore, between an inner ring 20A and the retainer 40A, a thrust bearing 15 is provided so that relative rotation is possible. Moreover, the worm gear 55 of the transmission ratio variation mechanism is meshed with a gear portion 30a formed on the outer peripheral face of the outer ring 30A. Reference symbol 12 in the figure denotes a bearing, 13 denotes an oil seal, 14 denotes a plate spring, and 16 denotes a tapered roller bearing.

In the transmission device 10A of such a construction, the torque of the inner ring 20A which becomes the input shaft Si, is transmitted to the output shaft portion 44 which becomes the output shaft So of the retainer 40A via the rolling bodies K disposed in the rolling body retaining portion 42. At this time, in the retainer 40A which becomes the output shaft So, the load regulation cam 50 adjusts the preload acting on the rolling bodies K corresponding to the torque of the input shaft Si. Therefore when there is no input torque, the preload can be kept to a minimum. The preload in this case is adjusted by the load regulation cam 50, and is produced by a thrust load f from the retainer main body 43 acting on the thrust bearing 15. Furthermore, since the worm gear 55 of the transmission ratio variation mechanism is connected to the gear portion 30a of the outer ring 30A of the traction input-output member, and performs differential rotation control, the transmission ratio of the input/output shafts can be changed.

Furthermore, the transmission device 10A of the above construction has the advantage in that the rotation directions of the input/output shafts become the same. Moreover, when compared under the same conditions, in particular since the face pressure on the rolling bodies K can be kept rather low, this is advantageous from the aspect of life and durability.

Figure 4:
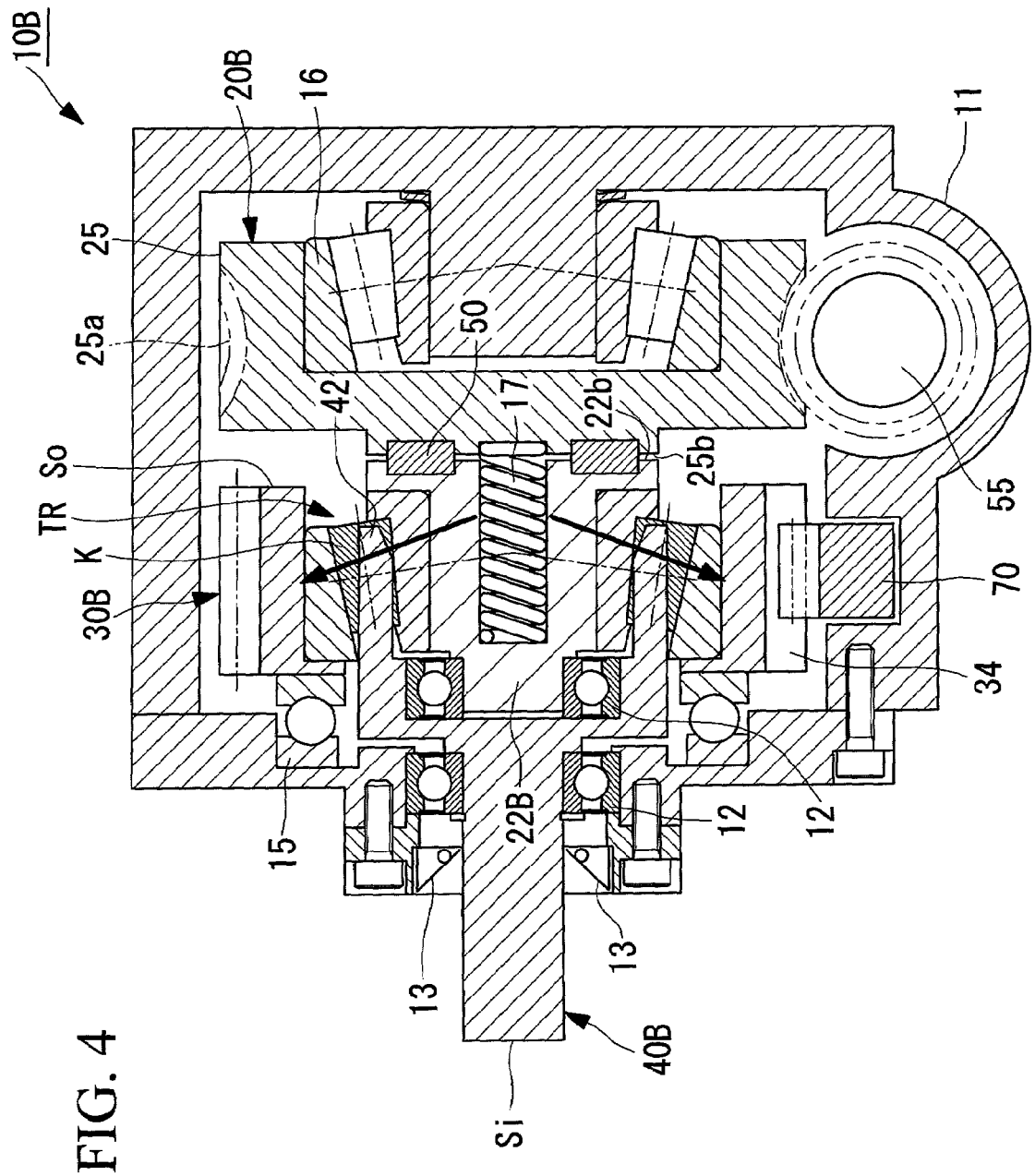
FIG. 4 is cross-section showing a second modified example of the traction drive transmission device of FIG. 1.

Next is a description of a second modified example of the transmission device according to the first embodiment, based on FIG. 4. Components the same as for the above-mentioned embodiment are denoted by the same reference symbols, and their detailed description is omitted.

In the transmission device 10B described by this modified example, the construction is such that the comb shape rolling body retaining portion 42 is provided on a retainer 40B which is furnished with the input shaft Si, the rolling bodies K disposed in the rolling body retaining portion 42 are arranged between an inner ring portion 20B of a two piece construction, and the outer ring 30B which becomes the output shaft So, and the load regulation cam 50 of the preload adjusting means, is provided between the opposing faces of the inner ring 20B, and together with this, a worm gear 55 of a transmission ratio variation mechanism is connected to the inner ring 20B.

In this case, the inner ring 20B is divided into two, namely an inner ring portion 22B and a gear forming portion 25, and between the opposing faces 22b and 25b of the inner ring portion 22B and the gear forming portion 25 is disposed the load regulation cam 50 and a coil spring 17 which stipulates a minimum preload. A gear portion 25a formed on the outer peripheral face of the gear forming portion 25 is meshed with the worm gear 55 of the transmission ratio variation mechanism.

Furthermore, on the outer peripheral face of the outer ring 30B which becomes the output shaft So, is also formed a gear portion 34. For example, this gear portion 34 may be meshed with a rack gear 70 to obtain an output where the rotational motion is converted to linear motion. In this case, formation of the gear portion 34 may be on the side face of the outer ring 30B.

Reference symbol 12 in the figure denotes a bearing, 13 denotes an oil seal, 15 denotes a thrust bearing, and 16 denotes a tapered roller bearing.

In the transmission device 10B of such a construction, the torque of the retainer 40B which becomes the input shaft Si, is transmitted to the outer ring 30B which becomes the output shaft So, via the rolling bodies K disposed in the rolling body retaining portion 42. At this time, in the inner ring 20B, the load regulation cam 50 adjusts the preload acting on the rolling bodies K corresponding to the torque of the input shaft Si. Therefore when there is no input torque, the preload can be kept to a minimum. Furthermore, since the worm gear 55 of the transmission ratio variation mechanism is connected to the gear portion 25a of the gear forming portion 25 which is separated from the inner ring 2B of the traction input-output member, and performs differential rotation control, the transmission ratio of the input/output shafts can be changed.

Furthermore, not only does the transmission device 10B of the above construction have the advantage that the rotation directions of the input/output shafts become the same, but the number of necessary bearings can be reduced, so that assembly during production is simplified. Moreover, when compared under the same conditions, this can operate in a range where the number of revolutions of the worm gear 55 is relatively low. Therefore the operating noise can be kept down. Furthermore, the bearing force on the rolling bodies K can be kept comparatively low, and also the transmission torque of the input shaft Si provided with the load regulation cam 50 can be set relatively low. Therefore this is advantageous from the aspect of life and durability. In particular, if this is constructed with a built in rack and pinion mechanism provided with the rack 70, then a more compact vehicle steering gear device is possible.

Figure 5:
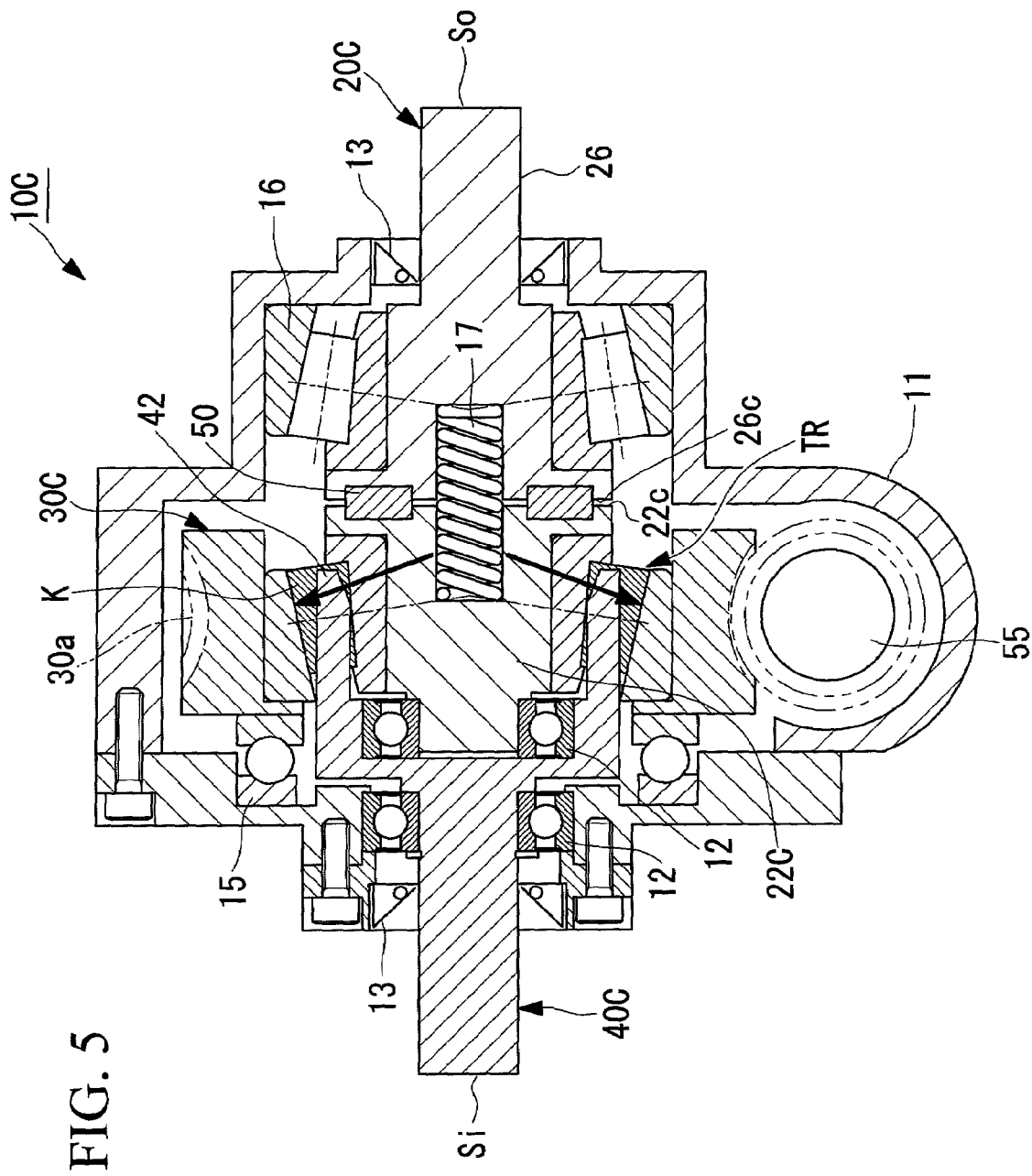
FIG. 5 is cross-section showing a third modified example of the traction drive transmission device of FIG. 1.

Next is a description of a third modified example of the transmission device according to the first embodiment, based on FIG. 5. Components the same as for the abovementioned embodiment are denoted by the same reference symbols, and their detailed description is omitted.

In the transmission device 10C described by this modified example, the construction is such that the comb shape rolling body retaining portion 42 is provided on a retainer 40C which is furnished with the input shaft Si, the rolling bodies K disposed in the rolling body retaining portion 42 are arranged between an inner ring portion 20C provided with the output shaft So, and the outer ring 30C, and the load regulation cam 50 serving as the preload adjusting part, is provided on the inner ring 20C, and together with this, a worm gear 55 of a transmission ratio variation mechanism is connected to the outer ring 30C.

The inner ring 20C for this case is divided into two, namely an inner ring portion 22C and an output shaft portion 26, and between the opposing faces 22c and 26c of the inner ring portion 22C and the output shaft portion 26 is disposed the load regulation cam 50 and a coil spring 17 which stipulates a minimum preload.

In the transmission device 10C of such a construction, the torque of the retainer 40C which becomes the input shaft Si, is transmitted to the inner ring portion 22C of the inner ring 20C which becomes the output shaft So, via the rolling bodies K disposed in the rolling body retaining portion 42. At this time, in the inner ring 20C, the preload regulation cam 50 adjusts the preload acting on the rolling bodies K corresponding to the torque of the input shaft Si. Therefore when there is no input torque, the preload can be kept to a minimum. Furthermore, since the worm gear 55 of the transmission ratio variation mechanism is connected to the gear portion 30a formed on the outer ring 30C of the traction input-output member, and performs differential rotation control, the transmission ratio of the input/output shafts can be changed.

Furthermore, not only does the transmission device 10C of the above construction have the advantage that the rotation directions of the input/output shafts become the same, but the number of necessary bearings can be reduced, so that assembly during production is simplified. In particular, when compared under the same conditions, this can operate in a range where the number of revolutions of the worm gear 55 is low. Therefore the operating noise can be kept down.

Figure 6:
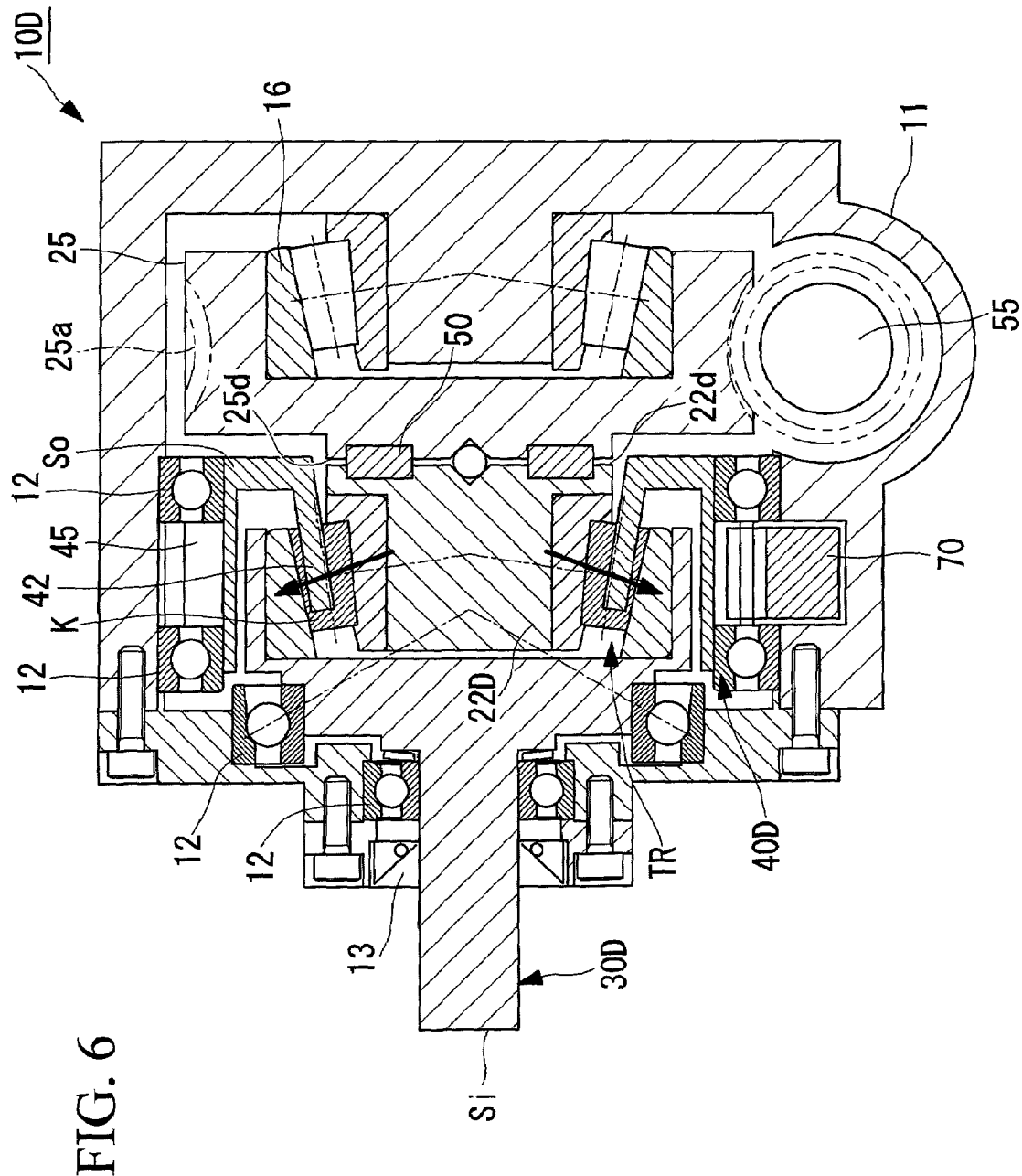
FIG. 6 is cross-section showing a fourth modified example of the traction drive transmission device of FIG. 1.

Next is a description of a fourth modified example of the transmission device according to the first embodiment, based on FIG. 6. Components the same as for the abovementioned embodiment are denoted by the same reference symbols, and their detailed description is omitted.

In the transmission device 10D described by this modified example, the construction is such that the comb shape rolling body retaining portion 42 is provided on a retainer 40D which becomes the output shaft So, the rolling bodies K disposed in the rolling body retaining portion 42 are arranged between an inner ring portion 20D of a two piece construction, and the outer ring 30D provided with the input shaft Si, and the load regulation cam 50 of the preload adjusting part, is provided between the opposing faces of the inner ring 20D, and together with this, a worm gear 55 of a transmission ratio variation mechanism is connected to the inner ring 20D.

In this case, the inner ring 20D is divided into two, namely an inner ring portion 22D and a gear forming portion 25, and between the opposing faces 22d and 25d of the inner ring portion 22D and the gear forming portion 25 is disposed the load regulation cam 50. A gear portion 25a formed on the outer peripheral face of the gear forming portion 25 is meshed with the worm gear 55 of the variable transmission mechanism.

Furthermore, on the outer peripheral face of the retainer 40D which becomes the output shaft So, is also formed a gear portion 45. For example, this gear portion 45 may be meshed with a rack gear 70 to obtain an output where the rotational motion is converted to linear motion. The gear portion 45 in this case may be formed on the side face of the retainer 40D.

Reference symbol 12 in the figure denotes a bearing, 13 denotes an oil seal, 14 denotes a minimum preload stipulating plate spring, and 16 denotes a tapered roller bearing.

In the transmission device 10D of such a construction, the torque of the outer ring 30D which becomes the input shaft Si, is transmitted to the retainer 40D which becomes the output shaft So, via the rolling bodies K disposed in the rolling body retaining portion 42. At this time, in the inner ring 20D, the load regulation cam 50 adjusts the preload acting on the rolling bodies K corresponding to the torque of the input shaft Si. Therefore when there is no input torque, the preload can be kept to a minimum. Furthermore, since the worm gear 55 of the transmission ratio variation mechanism is connected to the gear portion 25a of the gear forming portion 25 which is separated from the inner ring 20D of the traction input member, and performs differential rotation control, the transmission ratio of the input/output shafts can be changed.

Furthermore, the transmission device 10D of the above construction has the advantage that the rotation directions of the input/output shafts become the same. Moreover, when compared under the same conditions, the bearing force on the rolling bodies K can be kept low, and also the transmission torque of the input shaft Si provided with the load regulation cam 50 can be set low. Therefore this is extremely advantageous from the aspect of life and durability. If this is constructed with a built in rack and pinion mechanism provided with the rack 70, then a more compact vehicle steering gear device is possible.

Figure 7:
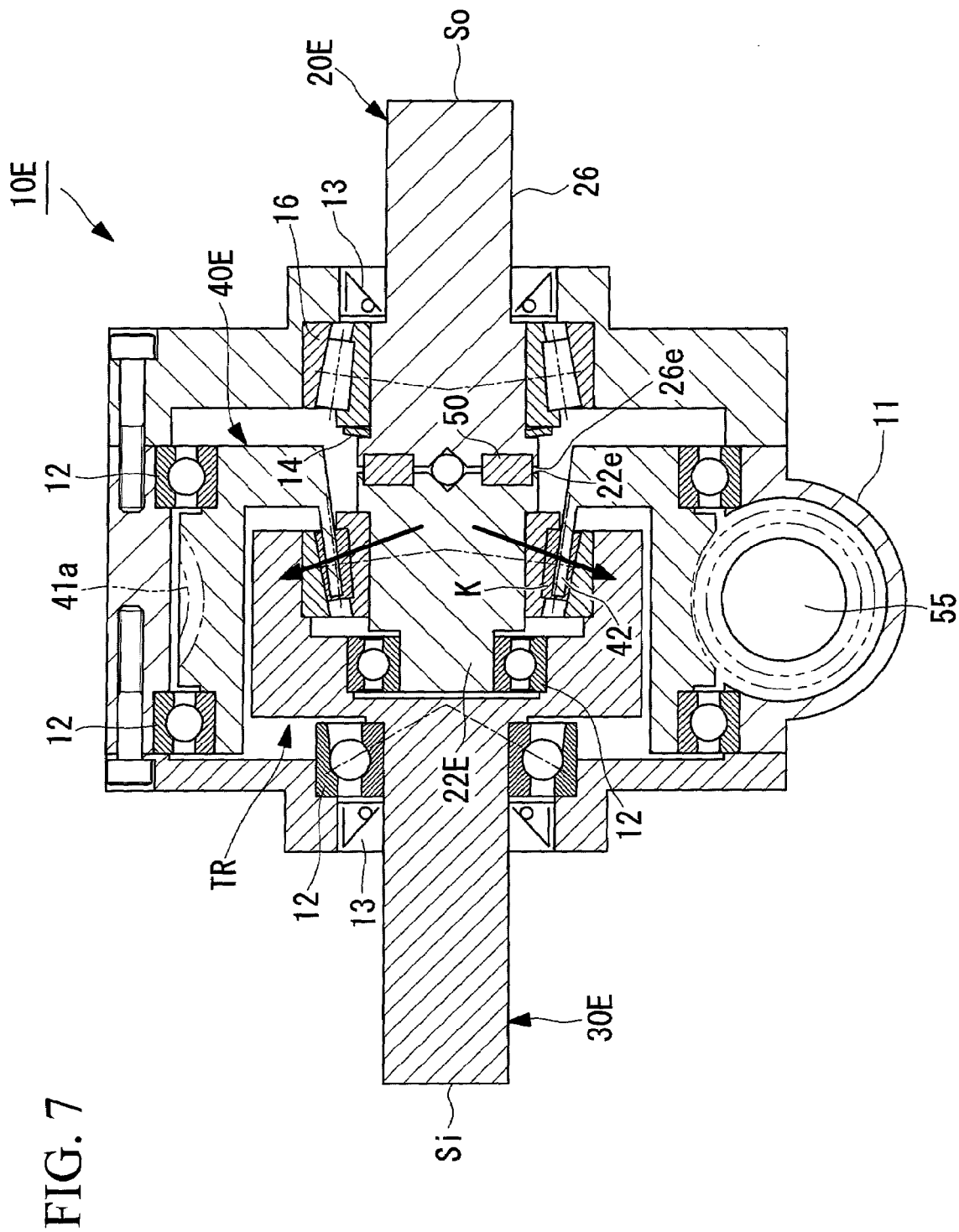
FIG. 7 is cross-section showing a fifth modified example of the traction drive transmission device of FIG. 1.

Next is a description of a fifth modified example of the transmission device according to the first embodiment, based on FIG. 7. Components the same as for the abovementioned embodiment are denoted by the same reference symbols, and their detailed description is omitted.

In the transmission device 10E described by this modified example, the construction is such that the comb shape rolling body retaining portion 42 is provided on a retainer 40E, the rolling bodies K disposed in the rolling body retaining portion 42 are arranged between an inner ring 20E of a two piece construction provided with the output shaft So, and the outer ring 30E provided with the input shaft Si, and the load regulation cam 50 serving as the preload adjusting means, is provided between the opposing faces of the inner ring 20E, and together with this, a worm gear 55 of a transmission ratio variation mechanism is connected to the retainer 40E.

In this case, the inner ring 20E is divided into two, namely an inner ring portion 22E and an output shaft portion 26, and on the opposing faces 22e and 26e of the inner ring portion 22E and the output shaft portion 26 is disposed the load regulation cam 50.

In the transmission device 10E of such a construction, the torque of the output shaft 30D which becomes the input shaft Si, is transmitted to the inner ring portion 22E of the inner ring 20E which becomes the output shaft So, via the rolling bodies K disposed in the rolling body retaining portion 42. At this time, in the inner ring 20E which becomes the output shaft So, the preload cam 50 adjusts the preload acting on the rolling bodies K corresponding to the torque of the input shaft Si. Therefore when there is no input torque, the preload can be kept to a minimum. Furthermore, since the worm gear 55 of the transmission ratio variation mechanism is connected to the gear portion formed on the retainer 40E of the traction input-output member, and performs differential rotation control, the transmission ratio of the input/output shafts can be changed.

Furthermore, regarding the transmission device 10C of the above construction, when compared under the same conditions, this can operate in a range where the number of revolutions of the worm gear 55 is comparatively low. Therefore the operating noise can be kept down.

Second Embodiment

Next is a description of a second embodiment of a transmission device according to the present invention, based on the drawings. In the embodiment described hereunder, the input/output of the abovementioned traction drive transmission is connected in two sets to give a two stage transmission configuration which carries out transmission which is inverse to the transmission in a first stage, in a second stage. Components the same as for the abovementioned embodiment are denoted by the same reference symbols, and their detailed description is omitted.

Figure 8:
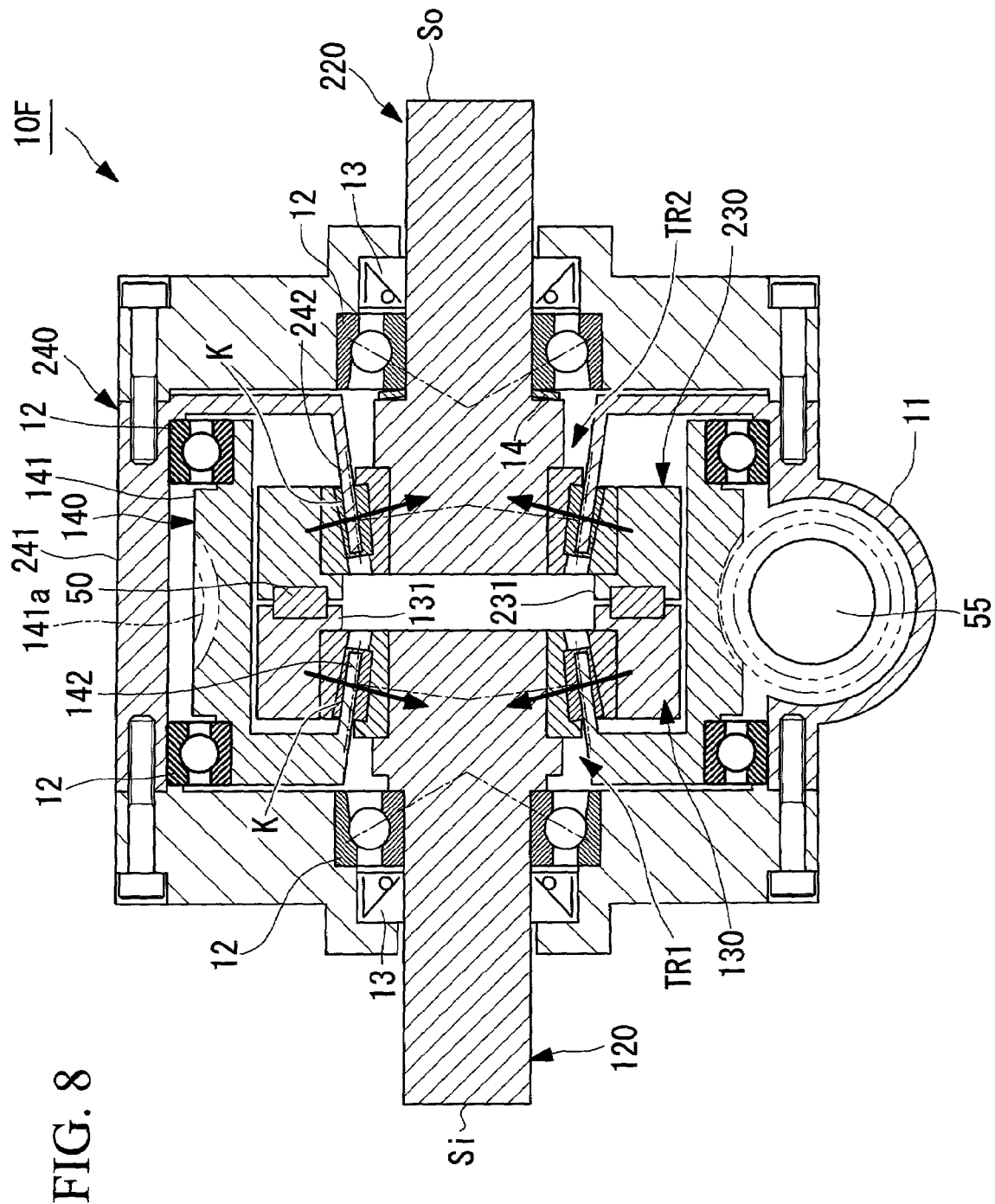
FIG. 8 is a cross-section showing a second embodiment of a traction drive transmission device according to the present invention.

A transmission device 10F of this embodiment shown in FIG. 8 is constructed so that the traction of rolling bodies K arranged between an input shaft Si and an output shaft So is used to change the number of revolutions of the input shaft Si into a desired transmission ratio, and output from the output shaft So, and the input shaft Si and the output shaft So are connected in left/right symmetry to perform two stage transmission.

The input shaft Si and the output shaft So which protrude to opposite sides of the housing 11, are shaft members provided on the inner ring of a first stage transmission section TR1 and a second stage transmission section TR2 which are connected so as to have substantially left/right symmetry in the axial direction.

The first stage transmission section TR1 is constructed such that a comb shape rolling body retaining portion 142 is provided on a main body 141 of a first retainer 140, and rolling bodies K disposed in the rolling body retaining portion 142 are arranged between a first inner ring 120 provided with the input shaft Si, and a first outer ring 130 provided with a connection output shaft 131. Also in this case, the rolling body retaining portion 142 is not limited to a comb shape, and a ladder shape or the like may be suitably selected.

The second stage transmission section TR2 is constructed such that a comb shape rolling body retaining portion 242 is provided in a main body 241 of a second retainer 240, and rolling bodies K disposed in the rolling body retaining portion 242 are arranged between a second inner ring 220 provided with the output shaft So, and a second outer ring 230 provided with a connection input shaft 231. Also in this case, the rolling body retaining portion 242 is not limited to a comb shape, and a ladder shape or the like may be suitably selected.

The abovementioned rolling bodies K are arranged at an incline so that their rolling axis is not orthogonal to the axis of the input shaft Si and the output shaft So, for either of the first stage transmission section TR1 and the second stage transmission section TR2.

On the shaft connection portion where the end portion end faces of the connection output shaft 131 of the first stage transmission section TR1 and the connection input shaft 231 of the second stage transmission section TR2 are connected facing each other, is provided a load regulation cam 50 which functions as a preload adjusting part. This load regulation cam 50, similarly to the aforementioned first embodiment, is accommodated inside a space of recess portions formed between the opposing faces of the shaft connecting portion, in a condition where it can roll and slide thereinside. These recess portions are provided as a plurality of sets radiating from the axial center so as to have the same pitch around the circumferential direction. The number thereof may be appropriately selected corresponding to various conditions.

Moreover, the first retainer 140 is furnished with a gear portion 141*a* formed on the outer peripheral face of the main body 141. This gear portion 141*a* is meshed with a worm gear 55 which functions as a transmission ratio variation mechanism. That is to say, in this construction, the traction drive structure described for the first embodiment is one where the input/output shafts are assembled so as to be in left/right symmetry. The second retainer 240 is an immovable member which is fixed to the housing 11 and forms one portion thereof. Reference symbol 12 in the figure denotes a bearing, 13 denotes an oil seal, and 14 denotes a plate spring.

According to this transmission device 10F, in the first stage transmission section TR1, the torque of the first inner ring 120 which becomes the input shaft Si, is transmitted via the rolling bodies K which are disposed in the rolling body retaining portion 142 of the first retainer 140, to the first outer ring 130 furnished with the connection output shaft 131, by means of traction drive. Subsequently, in the second stage transmission section TR2, the torque is transmitted via the load regulation cam 50 which functions as a preload adjusting part, to the second outer ring 230 provided with the connection input shaft 231, and is transmitted to the second inner ring 220 which becomes the output shaft So, via the rolling bodies K disposed in the rolling body retaining portion 242 of the second retainer 240.

At this time, in the shaft connection portion which connects between the connection output shaft 131 and the connection input shaft 231 via the load regulation cam 50, the load regulation cam 50 adjusts the preload acting on the rolling bodies of the first stage transmission section and the second stage transmission section, corresponding to the torque of the connection output shaft 131. Therefore, when there is no input torque, this can be suppressed to a minimum preload stipulated by the plate spring 14. Furthermore, the worm gear 55 of the transmission ratio variation mechanism is connected to the gear portion 141*a* formed on the first retainer 140 of the traction input-output member, and performs differential rotation control. Therefore, the transmission ratio of the input/output shafts can be changed to a desired value.

Furthermore, after the transmission with the first stage transmission section TR1, the transmission device 10F of such a construction performs transmission in the opposite direction with the second stage transmission section TR2. Therefore, for example after stepping-up with the first stage transmission section TR1, this is stepped down with the second stage transmission section TR2, and the input/output relationship due to the micro traction becomes 1:1. Therefore, in the case where this device is assembled into a vehicle steering apparatus ST, it can be used with a present state rack and pinion 64 without change.

Furthermore, regarding the abovementioned transmission device 10F, when compared under the same conditions, this can operate in a range where the number of revolutions of the worm gear 55 is particularly low. Therefore the operating noise can be kept down. Furthermore, since the number of bearings used is few, this has the advantage in that assembly is simple.

Figure 9:
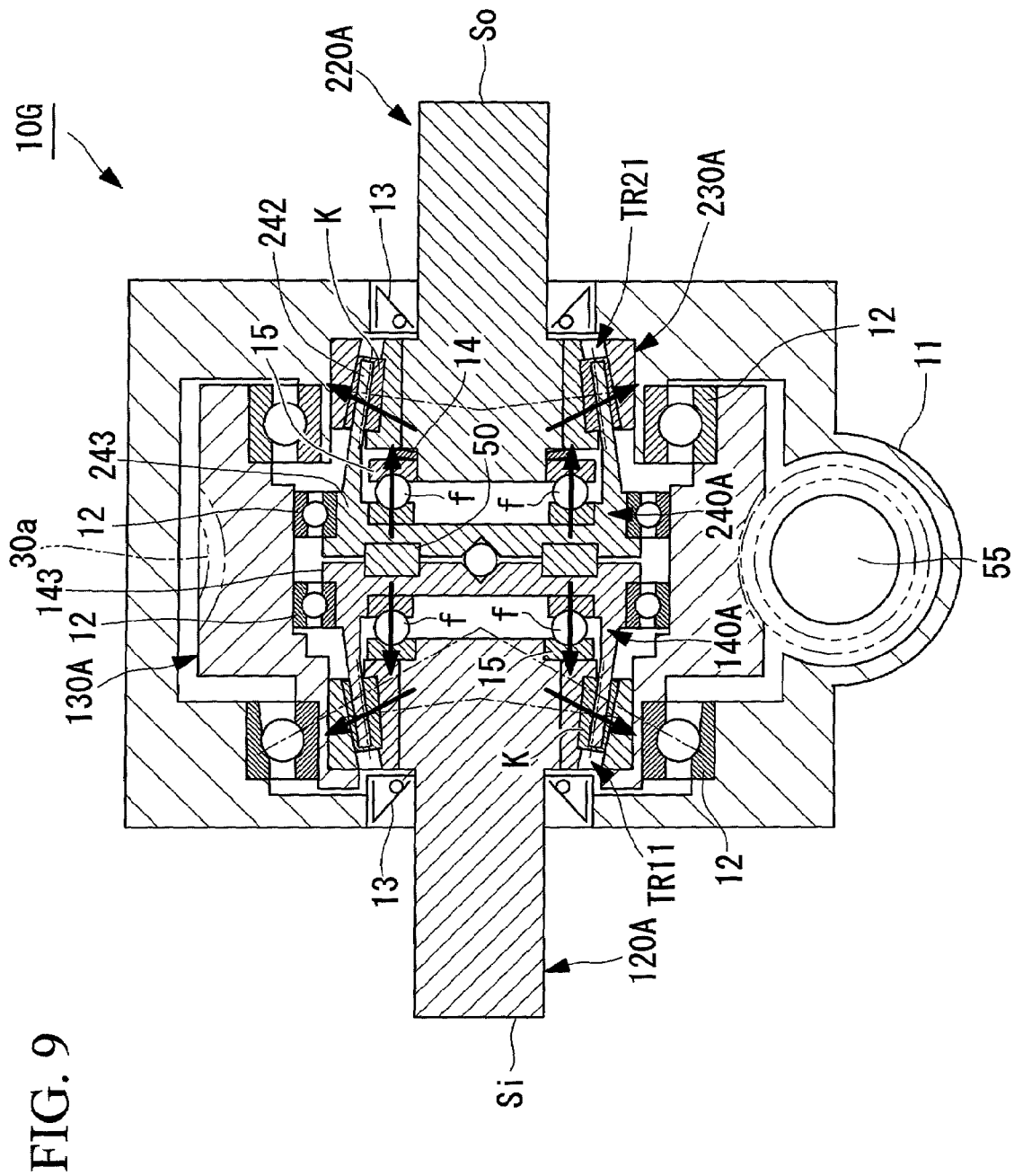
FIG. 9 is cross-section showing a first modified example of the traction drive transmission device of FIG. 8.

Next is a description of a first modified example of the transmission device according to the second embodiment, based on FIG. 9. Components the same as for the abovementioned embodiment are denoted by the same reference symbols, and their detailed description is omitted.

In the transmission device 10G described by this modified example, there is provided: a first stage transmission section TR11 with a comb shape rolling body retaining portion 142 provided on a first retainer 140A provided with a connection output shaft 143, with rolling bodies K disposed in this rolling body retaining portion 142, arranged between a first inner ring 120A provided with the input shaft Si, and a first outer ring 130A; and a second stage transmission section TR21 with a comb shape rolling body retaining portion 242 provided on a second retainer 240A provided with a connection input shaft 243, with rolling bodies K disposed in this rolling body retaining portion 242, arranged between a second inner ring 220A provided with the output shaft So, and a second outer ring (fixed as one to the housing 11). Furthermore, the construction is such that a load regulation cam 50 which functions as a preload adjusting part, is provided on a shaft connection portion of the connection output shaft 143 and the connection input shaft 243, and together with this, a worm gear 55 of a transmission ratio variation mechanism is connected to a gear portion 30a formed on the first outer ring 130A. That is to say, this construction is one where the traction drive mechanism of the first modified example described for the first embodiment is assembled so that the input/output shafts have left/right symmetry.

According to this transmission device 10G, in the first stage transmission section TR11, the torque of the first inner ring 120A which becomes the input shaft Si, is transmitted via the rolling bodies K which are disposed in the rolling body retaining portion 142 of the first retainer 140A, to the first retainer 140A furnished with the connection output shaft 143, by means of traction drive. Subsequently, in the second stage transmission section TR21, the torque transmitted via the load regulation cam 50 which functions as a preload adjusting part, to the second retainer 240A which becomes the connection input shaft 243, is transmitted to the second inner ring 220A which becomes the output shaft So by traction drive, via the rolling bodies K disposed in the rolling body retaining portion 242 of the second retainer 240A.

At this time, in the shaft connection portion which connects between the connection output shaft 143 and the connection input shaft 243 via the load regulation cam 50, the load regulation cam 50 adjusts the preload acting on the rolling bodies K of the first stage transmission section TR11 and the second stage transmission section TR21, corresponding to the torque of the connection output shaft 143. Therefore, when there is no input torque, the preload can be suppressed to a minimum. Furthermore, the worm gear 55 of the transmission ratio variation mechanism is connected to the gear portion 30a formed on the first outer ring 130A of the traction input-output member, and performs differential rotation control. Therefore, the transmission ratio of the input/output shafts can be changed to a desired value.

Moreover, after the transmission with the first stage transmission section TR11, the transmission device 10G of such a construction performs transmission in the opposite direction with the second stage transmission section TR21. Therefore, for example after stepping-up with the first stage transmission section TR11, this is stepped down with the second stage transmission section TR21, and the input/output relationship due to the micro traction becomes 1:1. Therefore, in the case where this device is assembled into a vehicle steering apparatus ST, it can be used with a present state rack and pinion 64 without change.

Furthermore, regarding the aforementioned transmission device 10G, when compared under the same conditions, this can operate in a range where the number of revolutions of the worm gear 55 is comparatively low. Therefore the operating noise can be kept down.

Figure 10:
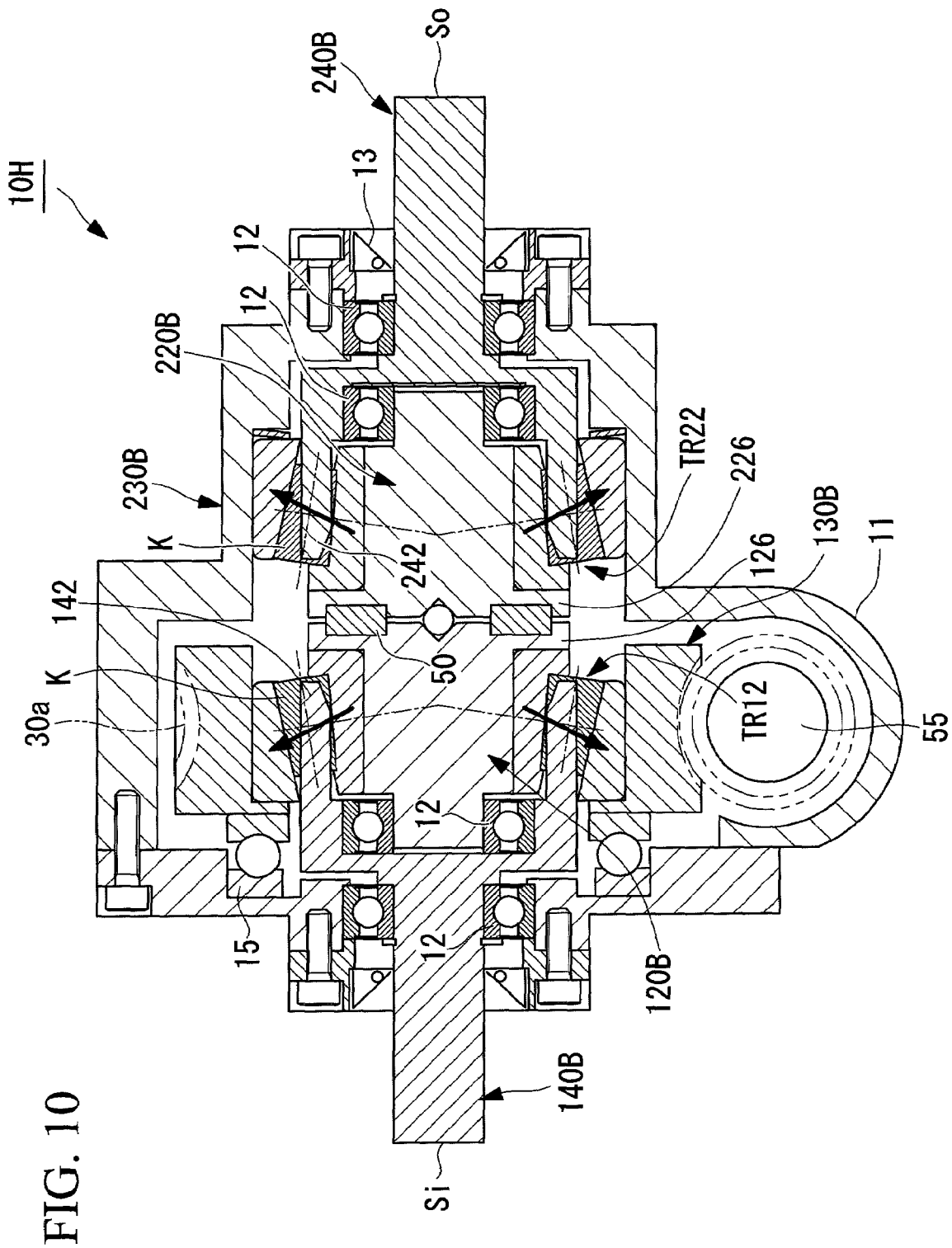
FIG. 10 is cross-section showing a second modified example of the traction drive transmission device of FIG. 8.

Next is a description of a second modified example of the transmission device according to the second embodiment, based on FIG. 10. Components the same as for the above-mentioned embodiment are denoted by the same reference symbols, and their detailed description is omitted.

In the transmission device 10H described by this modified example, there is provided: a first stage transmission section TR12 with a comb shape rolling body retaining portion 142 provided on a first retainer 140B provided with an input shaft Si, with rolling bodies K disposed in this rolling body retaining portion 142, arranged between a first inner ring 120B provided with a connection output shaft 126, and a first outer ring 130B; and a second stage transmission section TR22 with a comb shape rolling body retaining portion 242 provided on a second retainer 240B provided with an output shaft So, with rolling bodies K disposed in this rolling body retaining portion 242, arranged between a second inner ring 220B provided with a connection input shaft 226, and a second outer ring fixed as one to the housing 11. Furthermore, the construction is such that a load regulation cam 50 which functions as a preload adjusting part, is provided on a shaft connection portion of the connection output shaft 126 and the connection input shaft 226, and together with this, a worm gear 55 which functions as a transmission ratio variation mechanism is connected to a gear portion 30a formed on the first outer ring 130B. That is to say, this construction is one where the traction drive mechanism of the third modified example described for the first embodiment is assembled so that the input/output shafts have left/right symmetry.

According to this transmission device 10H, in the first stage transmission section TR12, the torque of the first retainer 140B which becomes the input shaft Si, is transmitted via the rolling bodies K which are disposed in the rolling body retaining portion 142 of the first retainer 140B, to the first inner ring 120B furnished with the connection output shaft 126.

Subsequently, in the second stage transmission section TR22, the torque is transmitted via the load regulation cam 50 which functions as a preload adjusting part, to the second inner ring 220B furnished with the connection input shaft 226. Furthermore the torque is transmitted to the second retainer 240B which becomes the output shaft So, via the rolling bodies K disposed in the rolling body retaining portion 242 of the second retainer 240B.

At this time, in the shaft connection portion which connects between the connection output shaft 126 and the connection input shaft 226 via the load regulation cam 50, the load regulation cam 50 adjusts the preload acting on the rolling bodies K of the first stage transmission section TR12 and the second stage transmission section TR22, corresponding to the torque of the connection output shaft 126. Therefore, when there is no input torque, the preload can be suppressed to a minimum. Furthermore, the worm gear 55 of the transmission ratio variation mechanism is connected to the gear portion 30a formed on the first outer ring 130B of the traction input-output member, and performs differential rotation control. Therefore, the transmission ratio of the input/output shafts can be changed to a desired value.

Furthermore, after the transmission with the first stage transmission section TR12, the transmission device 10H of such a construction performs transmission in the opposite direction with the second stage transmission section TR22. Therefore, for example after stepping-up with the first stage transmission section TR12, this is stepped down with the second stage transmission section TR22, and the input/output relationship due to the micro traction becomes 1:1. Therefore, in the case where this device is assembled into a vehicle steering apparatus ST, it can be used with a present state rack and pinion 64 without change.

Furthermore, regarding the aforementioned transmission device 10H, since the number of bearings is comparatively small, assembly is simplified. Moreover, when compared under the same conditions, in particular since the face pressure on the rolling bodies K can be kept low, and also the transmission torque of the input shaft Si provided with the load regulation cam 50 can be set low, this is advantageous from the aspect of life and durability.

Figure 11:
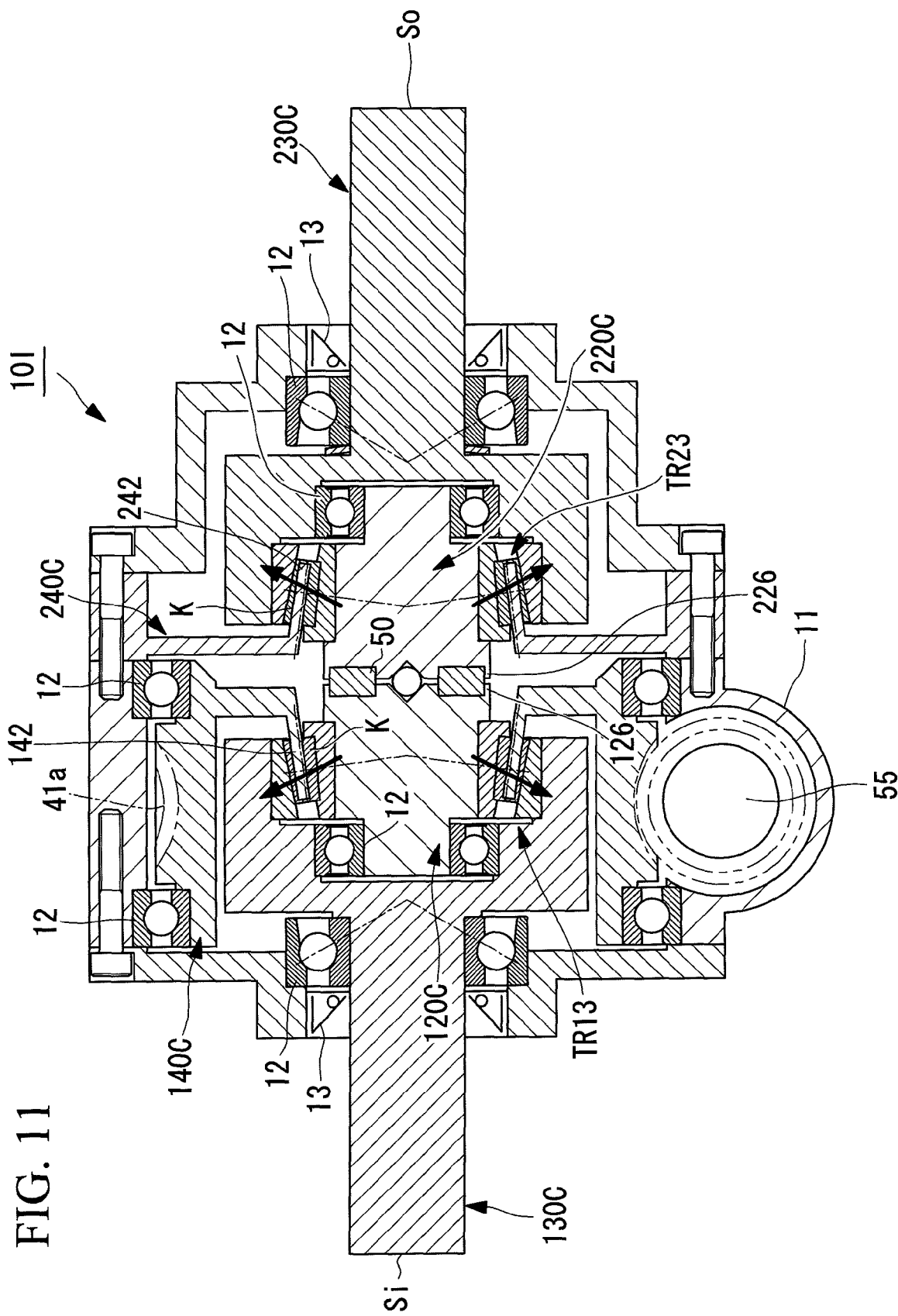
FIG. 11 is cross-section showing a third modified example of the traction drive transmission device of FIG. 8.

Next is a description of a third modified example of the transmission device according to the second embodiment, based on FIG. 11. Components the same as for the abovementioned embodiment are denoted by the same reference symbols, and their detailed description is omitted.

In the transmission device 10I described by this modified example, there is provided: a first stage transmission section TR13 with a comb shape rolling body retaining portion 142 provided on a first retainer 140C, with rolling bodies K disposed in this rolling body retaining portion 142, arranged between a first inner ring 120C provided with a connection output shaft 126, and a first outer ring 130C provided with an input shaft Si; and a second stage transmission section TR23 with a comb shape rolling body retaining portion 242 provided on a second retainer 240C, with rolling bodies K disposed in this rolling body retaining portion 242, arranged between a second inner ring 220C provided with a connection input shaft 226, and a second outer ring 230C provided with an output shaft So. Furthermore, the construction is such that a load regulation cam 50 which functions as a preload adjusting part, is provided on a shaft connection portion of the connection output shaft 126 and the connection input shaft 226, and together with this, a worm gear 55 which functions as a transmission ratio variation mechanism is connected to a gear portion 41a formed on the first retainer 140C. That is to say, this construction is one where the traction drive mechanism of the fifth modified example described for the first embodiment is assembled so that the input/output shafts have left/right symmetry.

According to this transmission device 10I, in the first stage transmission section TR13, the torque of the first outer ring 130C which becomes the input shaft Si, is transmitted via the rolling bodies K which are disposed in the rolling body retaining portion 142 of the first retainer 140C, to the first inner ring 120C furnished with the connection output shaft 126. Subsequently, in the second stage transmission section TR23, the torque transmitted via the load regulation cam 50 which functions as a preload adjusting part, to the second inner ring 220C furnished with the connection input shaft 226, is transmitted to the second outer ring 230C which becomes the output shaft So, via the rolling bodies K disposed in the rolling body retaining portion 242 provided on the immovable second retainer which is fixed to the housing 11 and forms one portion thereof.

At this time, in the shaft connection portion which connects between the connection output shaft 126 and the connection input shaft 226 via the load regulation cam 50, the load regulation cam 50 adjusts the preload acting on the rolling bodies K of the first stage transmission section TR13 and the second stage transmission section TR23, corresponding to the torque of the connection output shaft 126. Therefore, when there is no input torque, the preload can be suppressed to a minimum. Furthermore, the worm gear 55 of the transmission ratio variation mechanism is connected to the gear portion 41a formed on the first retainer 140C of the traction input-output member, and performs differential rotation control. Therefore, the transmission ratio of the input/output shafts can be changed to a desired value.

Moreover, after the transmission with the first stage transmission section TR13, the transmission device 10I of such a construction performs transmission in the opposite direction with the second stage transmission section TR23. Therefore, for example after stepping-up with the first stage transmission section TR13, this is stepped down with the second stage transmission section TR23, and the input/output relationship due to the micro traction becomes 1:1. Therefore, in the case where this device is assembled into a vehicle steering apparatus ST, it can be used with a present state rack and pinion 64 without change.

Furthermore, regarding the aforementioned transmission device 10I, when compared under the same conditions, since the face pressure on the rolling bodies K can be kept low, and also the transmission torque of the input shaft Si provided with the load regulation cam 50 can be set low, this is advantageous from the aspect of life and durability. Furthermore, this can operate in a range where the number of revolutions of the worm gear 55 is comparatively low. Therefore the operating noise can be kept down.

Figure 12:
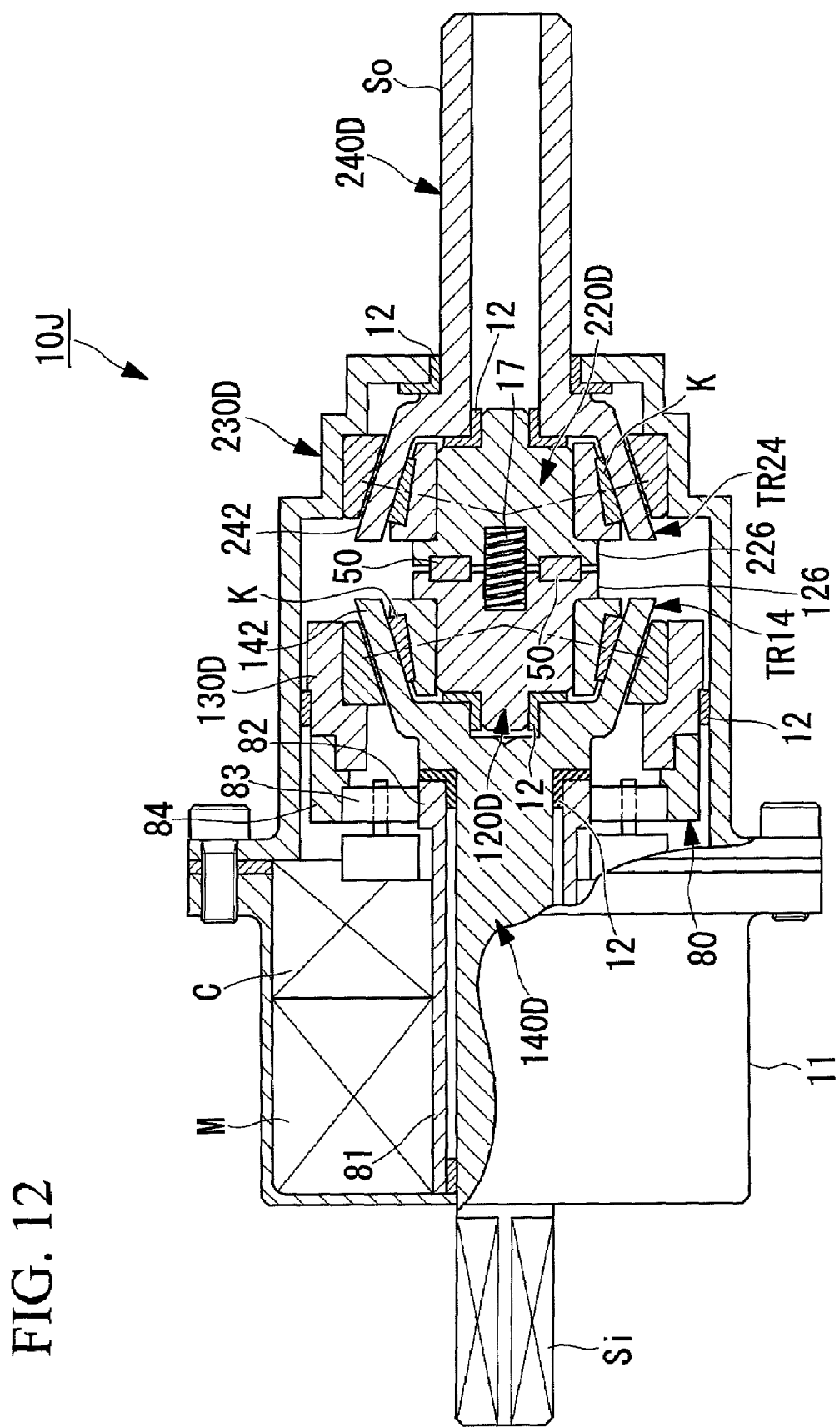
FIG. 12 is cross-section showing a fourth modified example of the traction drive transmission device of FIG. 8.

Next is a description of a fourth modified example of the transmission device according to the second embodiment, based on FIG. 12. Components the same as for the abovementioned embodiment are denoted by the same reference symbols, and their detailed description is omitted.

In the transmission device 10J described by this modified example, the construction is different in that instead of the transmission ratio variation mechanism using the worm gear 55 described up to now, a planetary type reduction gear 80 with a hollow motor M as a drive source is adopted. Moreover the transmission device 10J is provided with: a first stage transmission section TR14 with a comb shape rolling body retaining portion 142 provided on a first retainer 140D provided with an input shaft Si, with rolling bodies K disposed in this rolling body retaining portion 142, arranged between a first inner ring 120D provided with a connection output shaft 126, and a first outer ring 130D; and a second stage transmission section TR24 with a comb shape rolling body retaining portion 242 provided on a second retainer 240D provided with an output shaft So, with rolling bodies K disposed in this rolling body retaining portion 242, arranged between a second inner ring 220D provided with a connection input shaft 226, and a second outer ring fixed as one to the housing 11. Furthermore, the construction is such that a load regulation cam 50 which functions as a preload adjusting part, is provided on a shaft connection portion of the connection output shaft 126 and the connection input shaft 226, and together with this, the planetary type reduction gear 80 which functions as a transmission ratio variation mechanism is connected to the first outer ring 130D. That is to say, the construction of the fourth modified example is one where in the aforementioned transmission device 10H of the second modified example, the worm gear 55 of the variable transmission mechanism is changed to the planetary type reduction gear 80. Reference symbol C in the figure denotes a lock mechanism which includes a clutch or the like.

The planetary type reduction gear 80 has the hollow motor M provided on the same axis as the input shaft Si and the output shaft So as a drive source, and comprises; a sun roller 82 provided on a hollow motor shaft 81, a plurality of planetary rollers 83, and a ring roller 84 provided on the outer peripheral side of the planetary rollers 83.

The input shaft Si provided on a first retainer 140D is arranged so as to pass through the inside of the hollow motor shaft 81. On the hollow motor shaft 81, on the end outer peripheral face on the rolling body retaining portion 142 side, is provided the sun roller 82 formed with a gear portion. On the outer peripheral face of the sun roller 82 is provided the plurality of planetary rollers 83 engaged with the gear portion, at an equal pitch around the circumferential direction. Furthermore, on the outer peripheral side of the respective planetary rollers 83 is provided the ring roller 84 which is connected to the first outer ring 130D by a spline coupling or the like. In this ring roller 84, gear portions formed on the inner peripheral face thereof are meshed with the planetary rollers 83.

In the planetary type reduction gear 80 of this construction, when the sun roller 82 which is formed as one with the hollow motor shaft 81 is rotated by the drive of the hollow motor M, the number of revolutions of the sun roller 82 is changed (stepped down) corresponding to the number of teeth of the gear portion formed on the sun roller 82, the number of teeth of the planetary rollers 83, and the number of teeth of the gear portion formed on the ring roller 84, and is transmitted to the ring roller 84. The rotation of the ring roller 84 rotates the first outer ring 130D of the traction input-output member connected integrally thereto. Therefore, similarly to the aforementioned worm gear 55 of the variable transmission mechanism, differential rotation control can be performed so that the transmission ratio of the input/output shafts can be changed to a desired value.

That is to say, since the number of revolutions transmitted to the ring roller 84 and the first outer ring 130D can be changed by the number of revolutions control of the hollow motor M, differential rotation control can be performed and the transmission ratio of the input/output shafts can be easily set.

Furthermore, since the construction is such that the hollow motor M is used and the input/output shaft is passed through inside the hollow motor shaft 81, then for example the member protruding in the circumferential direction as with the worm gear 55 can be obviated, or the protrusion amount can be made a minimum. Therefore the transmission device 10J can be made compact with a smaller outer diameter dimension. Such a transmission device 10J with small outside dimensions is ideal for example as a transmission for a vehicle steering device ST where it is difficult to ensure installation space.

According to this transmission device 10J, in the first stage transmission section TR14, the torque of the first retainer 140D which becomes the input shaft Si, is transmitted via the rolling bodies K which are disposed in the rolling body retaining portion 142 of the first retainer 140D, to the first inner ring 120B furnished with the connection output shaft 126.

Subsequently, in the second stage transmission section TR24, the torque is transmitted via the load regulation cam 50 which functions as a preload adjusting part, to the second inner ring 220C furnished with the connection input shaft 226. Furthermore the torque is transmitted to the second retainer 240B which becomes the output shaft So, via the rolling bodies K disposed in the rolling body retaining portion 242 of the second retainer 240B.

At this time, in the shaft connection portion which connects between the connection output shaft 126 and the connection input shaft 226 via the load regulation cam 50, the load regulation cam 50 adjusts the preload acting on the rolling bodies K of the first stage transmission section TR14 and the second stage transmission section TR24, corresponding to the torque of the connection output shaft 126. Therefore, when there is no input torque, the preload can be suppressed to a minimum. Furthermore, the planetary type reduction gear 80 of the transmission ratio variation mechanism is connected to the first outer ring 130D of the traction input-output member, and performs differential rotation control. Therefore, the transmission ratio of the input/output shafts can be changed to a desired value.

Furthermore, after the transmission with the first stage transmission section TR14, the transmission device 10J of such a construction performs transmission in the opposite direction with the second stage transmission section TR24. Therefore, for example after stepping-up with the first stage transmission section TR14, this is stepped down with the second stage transmission section TR24, and the input/output relationship due to the micro traction becomes 1:1. Therefore, in the case where this device is assembled into a vehicle steering apparatus ST, it can be used with a present state rack and pinion 64 without change.

The planetary type reduction gear 80 described above is not limited to the transmission device 10J of the construction shown in FIG. 12, and it is possible to employ this instead of the worm gear 55 of the aforementioned respective embodiments and modified examples.

Third Embodiment

Next is a description of a third embodiment of a transmission device according to the present invention, based on the drawings. In the embodiment described hereunder, the input/output of the abovementioned traction drive transmission is connected in two sets in left right symmetry to give a two stage transmission configuration which carries out transmission which is inverse to the transmission in a first stage at a different transmission ratio, in a second stage, which is different to the second embodiment which is of a two stage transmission configuration which carries out transmission which is inverse to the transmission in the first stage at the same transmission ratio. Components the same as for the abovementioned embodiment are denoted by the same reference symbols, and their detailed description is omitted.

Figure 13:
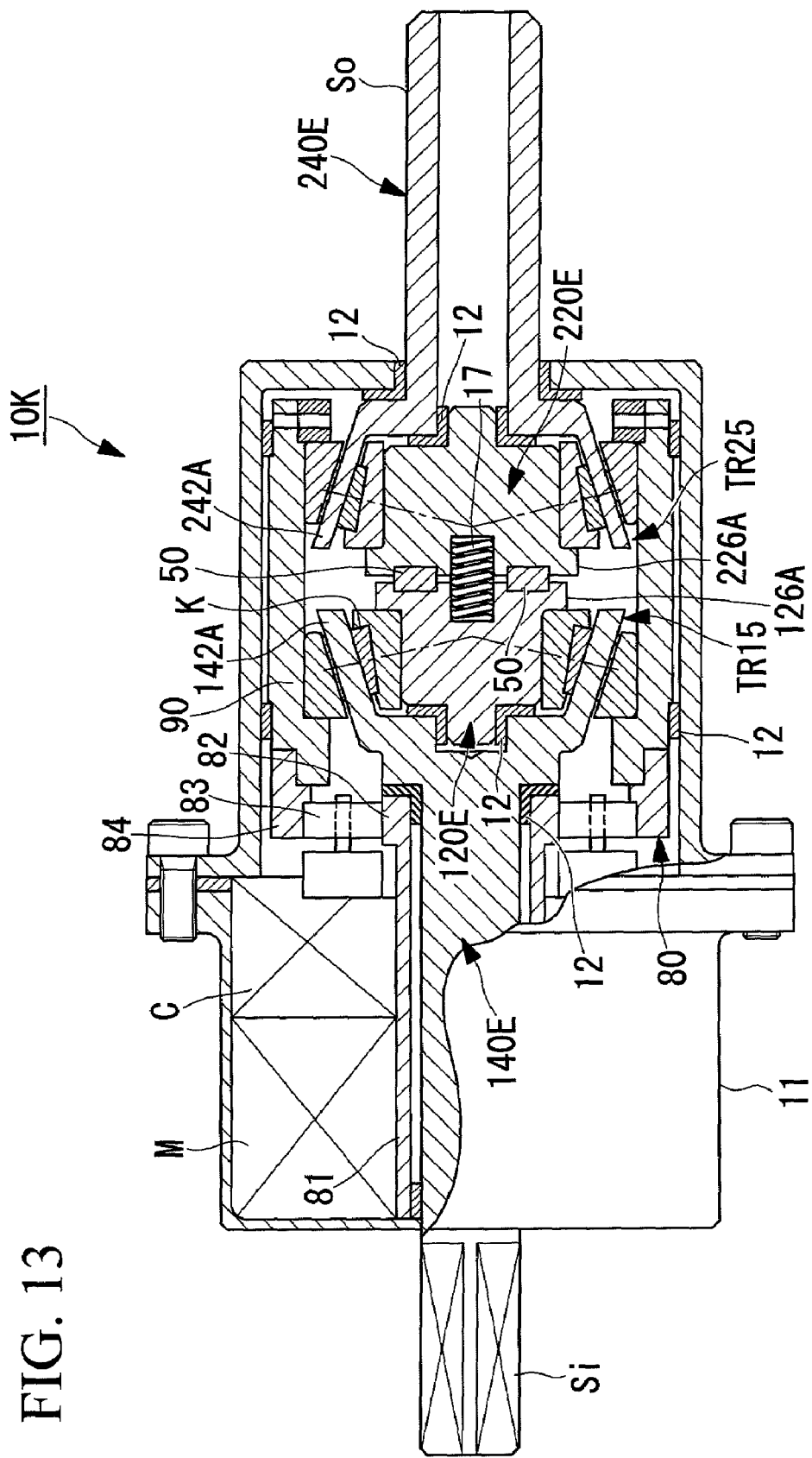
FIG. 13 is a cross-section showing a third embodiment of a traction drive transmission device according to the present invention.

A transmission device 10K of this embodiment shown in FIG. 13 is constructed so that the traction of rolling bodies K arranged between an input shaft Si and an output shaft So is used to change the number of revolutions of the input shaft Si into a desired transmission ratio, and output from the output shaft So, and the input shaft Si and the output shaft So are connected to perform two stage transmission. That is to say, a feature of the transmission device 10K is that the traction input-output members of the first stage transmission section TR15 and the second stage transmission section TR25 are connected and integrated, and together with this, a difference is provided in the transmission ratio of the two transmission sections TR15 and TR25. Other construction is substantially the same as for the transmission device 10J shown before in FIG. 11.

The input shaft Si and the output shaft So which protrude to opposite sides of the housing 11, are shaft members provided on the retainers of the first stage transmission section TR15 and the second stage transmission section TR25 which are connected in the axial direction.

The transmission device 10K comprises: the first stage transmission section TR15 with a comb shape rolling body retaining portion 142A provided on a first retainer 140E provided with an input shaft Si, with rolling bodies K disposed in this rolling body retaining portion 142A, arranged between a first inner ring 120E provided with a connection output shaft 126A, and an outer ring connection member 90; and the second stage transmission section TR25 with a comb shape rolling body retaining portion 242A provided on a second retainer 240E provided with an output shaft So, with rolling bodies K disposed in this rolling body retaining portion 242A, arranged between a second inner ring 220E provided with a connection input shaft 226A, and the outer ring connection member 90. Furthermore, the construction is such that a load regulation cam 50 which functions as a preload adjusting part, is provided on a shaft connection portion of the connection output shaft 126A and the connection input shaft 226A, and together with this, the planetary type reduction gear 80 which functions as a transmission ratio variation mechanism is connected to the outer ring connection member 90.

That is to say, this embodiment is constructed with the first stage transmission section TR15 and the second stage transmission section TR25 connected and integrated by the outer ring connection member 90, as the member which is equivalent to the first outer ring and the second outer ring which becomes the traction input-output member, and the planetary type reduction gear 80 of the variable transmission mechanism is connected to the outer ring connection member 90. Together with this, a configuration where the inner ring trajectory diameters and the like of the two transmission sections TR15 and TR25 are different is assembled together to provide a difference for the transmission ratio. In this case the difference provided for the transmission ratio of the two transmission sections TR15 and TR25 is not little.

The planetary type reduction gear 80 has the hollow motor M provided on the same axis as the input shaft Si and the output shaft So as a drive source, and comprises; a sun roller 82 provided on a hollow motor shaft 81, a plurality of planetary rollers 83, and a ring roller 84 provided on the outer peripheral side of the planetary rollers 83.

The input shaft Si provided on the first retainer 140E is arranged so as to pass through the inside of the hollow motor shaft 81. On the hollow motor shaft 81, on the end outer peripheral face on the rolling body retaining portion 142 side, is provided the sun roller 82 formed with a gear portion. On the outer peripheral face of the sun roller 82 is provided the plurality of planetary rollers 83 engaged with the gear portion, at an equal pitch around the circumferential direction. Furthermore, on the outer peripheral side of the respective planetary rollers 83 is provided the ring roller 84 which is connected to an outer ring connection member 90 by a spline coupling or the like. In this ring roller 84, gear portions formed on the inner peripheral face thereof are meshed with the planetary rollers 83.

In the planetary type reduction gear 80 of this construction, when the sun roller 82 which is formed as one with the hollow motor shaft 81 is rotated by the drive of the hollow motor M, the number of revolutions of the sun roller 82 is changed (stepped down) corresponding to the number of teeth of the gear portion formed on the sun roller 82, the number of teeth of the planetary rollers 83, and the number of teeth of the gear portion formed on the ring roller 84, and is transmitted to the ring roller 84. The rotation of the ring roller 84 rotates the outer ring connection member 90 of the traction input-output member connected integrally thereto, and together with this since there is a difference in the transmission ratio of the two transmission sections TR15 and TR25, the differential rotation control can be performed so that the transmission ratio of the input/output shafts can be changed to a desired value.

That is to say, since the number of revolutions transmitted to the ring roller 84 and the first outer ring 130D can be changed by the number of revolutions control of the hollow motor M, differential rotation control can be performed and the transmission ratio of the input/output shafts can be easily set.

Furthermore, since the construction is such that the hollow motor M is used and the input/output shaft is passed through inside the hollow motor shaft 81, then for example the member protruding in the circumferential direction as with the worm gear 55 can be obviated, or the protrusion amount can be made a minimum. Therefore the transmission device 10K can be made compact with a smaller outer diameter dimension. Such a transmission device 10K with small outside dimensions is ideal for example as a transmission for a vehicle steering device ST where it is difficult to ensure installation space.

The transmission device 10k of the above construction may use a worm gear 55 as the transmission ratio variation mechanism, which makes the outer dimension larger.

As described above, in the transmission device shown for the first embodiment of the present invention, the rotation axis of the rolling bodies K is arranged at an incline so that it is not orthogonal to the axis of the input shaft Si and the output shaft So, and there is provided: the load regulation cam 50 of the preload adjusting part which automatically changes the preload applied to the rolling bodies K corresponding to the torque of the input shaft Si; and the worm gear 55 of the differential type transmission ratio variation mechanism which performs number of revolutions control of the traction input-output member to change the transmission ratio, connected to the traction input-output member of the rolling bodies K. Therefore the preload applied to the rolling bodies K provided at an incline, is adjusted by the load regulation cam 50 corresponding to the torque of the input shaft Si. That is to say, the load regulation cam 50 produces a thrust load corresponding to the transmission torque, and this thrust load becomes a preload pressing the rolling bodies K in the axial direction. Furthermore, since the differential transmission ratio variation mechanism is provided, the transmission ratio of the input/output shafts can be adjusted and optionally set.

Furthermore, in the reduction gear shown in the second embodiment of the present invention, the rotation axis of the rolling bodies K is arranged at an incline so that it is not orthogonal to the axis of input shaft Si and the output shaft So, and there is provided: the load regulation cam 50 of the preload adjusting part which automatically changes the preload applied to the rolling bodies K corresponding to the torque between the shafts which connect the first stage transmission section and the second stage transmission section; and the worm gear 55 of the transmission ratio variation mechanism which performs number of revolutions control of the traction input-output member to change the transmission ratio, connected to the traction input-output member of the rolling bodies K. Therefore the preload applied to the rolling bodies K provided at an incline, is adjusted by the load regulation cam 50 which automatically changes the preload corresponding to the torque between the shafts which connect the first stage transmission section and the second stage transmission section. Furthermore, since the differential type transmission ratio variation mechanism is provided, the transmission ratio of the input/output shafts can be adjusted and optionally set. In this case, since the two stage transmission is performed by the first stage transmission section and the second stage transmission section, the input/output relationship for the traction drive can be made 1:1 in the same rotation direction.

In particular, if as the transmission ratio variation mechanism, a planetary type reduction gear which is driven by a hollow motor is adopted, the outside dimension in the radial direction can be reduced so that the apparatus can be miniaturized.

Fourth Embodiment

Figure 14:
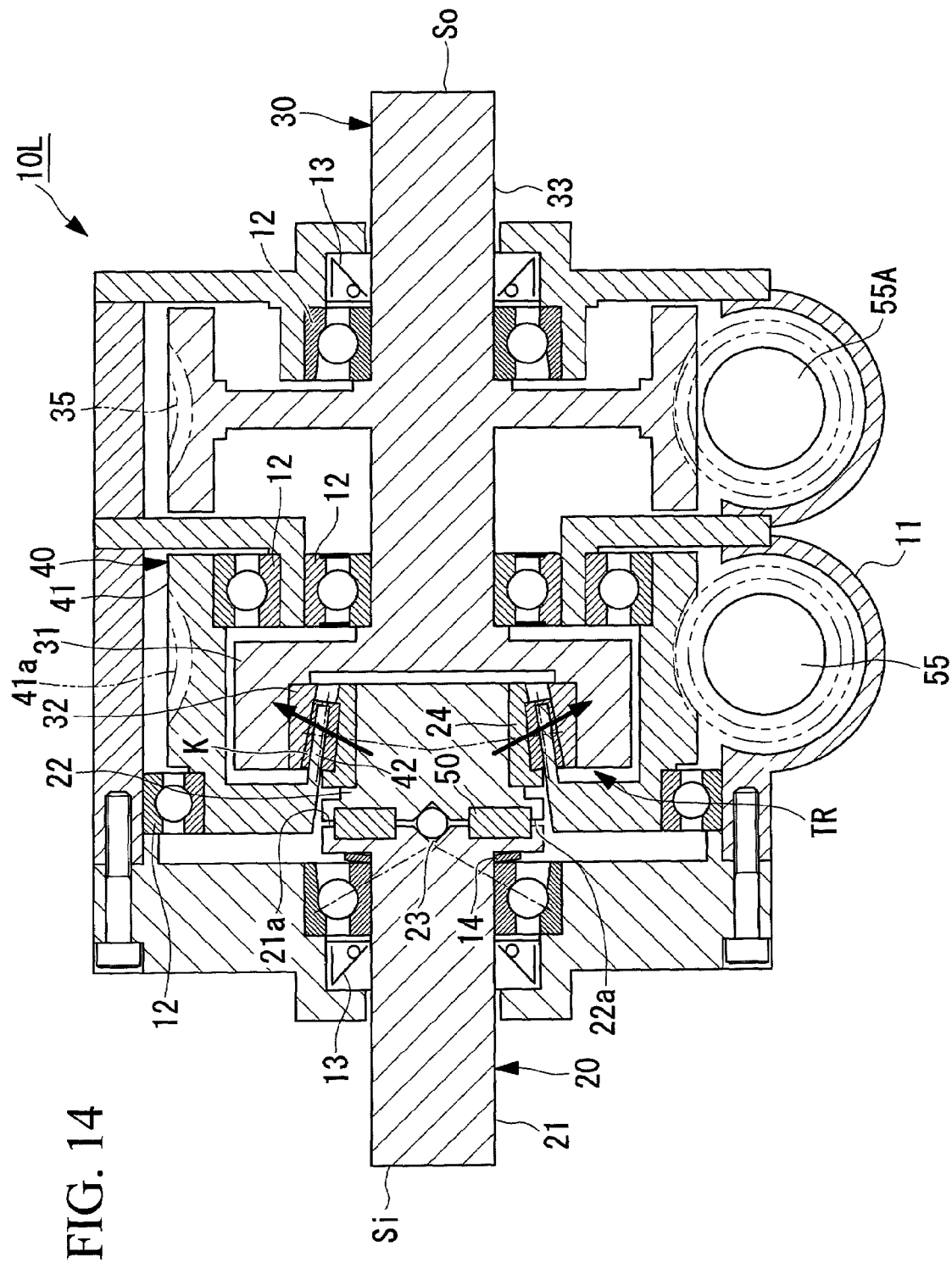
FIG. 14 is a cross-section showing a fourth embodiment of a traction drive transmission device according to the present invention.

FIG. 14 is a cross-section showing a fourth embodiment of a traction drive transmission device according to the present invention. In the embodiment described hereunder, the aforementioned transmission device is one provided with a transmission torque assisting mechanism which applies a turning force to the output shaft So to increase the transmission torque. Components the same as for the abovementioned embodiment are denoted by the same reference symbols, and their detailed description is omitted.

This transmission device 10L is one where the output shaft portion 33 of the transmission device 10 described in the first embodiment (FIG. 1) is additionally provided with a gear portion 35 positioned between the bearings 12. This gear portion 35 is a part for meshing with a later mentioned transmission torque assisting mechanism. The output shaft portion 33 which protrudes to the outside of the housing 11, is connected for example as with the rack and pinion device of the vehicle steering device, to a device on the driven side (not shown in the figure).

The gear portion 35 of the outer ring 30 which becomes the output shaft So, is meshed with a worm gear 55A so as to function as a transmission torque assisting mechanism which applies a turning force to the output shaft So, to increase the transmission torque. This worm gear 55A is driven by a driving part such as an electric motor or the like capable of variable control, and rotates the meshing output shaft So side to apply a desired rotation torque to the output torque of the transmission drive mechanism TR and increase this.

That is to say, the transmission torque output from the output shaft So becomes a large output torque, which is increased by applying a desired rotation torque from the worm gear 55A, to the torque which is output from the input shaft Si via the traction drive mechanism TR.

The transmission device 10L constructed in this manner is one in which there is provided a transmission torque assisting mechanism in addition to the function of the transmission device 10 described in the first embodiment. That is to say, when the worm gear 55A applies a desired turning force to the output shaft So, then regarding the transmission torque output via the traction drive mechanism TR, the torque finally output from the output shaft So is increased corresponding to the applied turning force.

Consequently, this becomes a transmission device 10L provided with a transmission torque assisting function (power assist function) in which even if the input torque of the input shaft Si is small, the final output torque is increased to a large value, by controlling the worm gear 55A to apply a desired turning force, corresponding to various conditions.

Furthermore, if this transmission device 10L is adopted for a vehicle steering device ST to perform the steering operation, the torque generated from the operation of the handle 60 is transmitted from the upper steering shaft 62 to the input shaft Si, and is changed into a desired transmission ratio inside the transmission device 10L. Together with this, an output torque which has been increased by applying a desired rotational torque to the transmission torque, is transmitted from the output shaft So to the lower steering shaft 63 so that the rack and pinion device 64 can be operated.

Consequently, in the case where the handle 60 is not operated, for example when stopped, or when travelling straight ahead, there is no torque on the upper steering shaft 62 and the input shaft Si, and hence the preload acting on the rolling bodies K becomes a minimum. Therefore, the life of the rolling bodies K is improved, which is effective for improving the durability and reliability of the vehicle steering device ST.

Furthermore, in the case where the operating amount of the handle 60 during low speed travel is large, such as when parking in a line, when the number of revolutions of the worm gear 55 is controlled to increase the transmission ratio, a large steering angle can be obtained with a small handle operating amount. That is to say, if the number of revolutions of the worm gear 55 is adjusted so that the number of revolutions of the input shaft Si is greatly increased in value and output from the output shaft So, then a small handle operation amount (the number of revolutions of the upper steering shaft 62) is increased in value and output to the lower steering shaft 63. Therefore the rack movement amount of the rack and pinion device 64 is increased, and the direction of the steering wheels 61 can be greatly changed. Therefore the operability of the vehicle steering apparatus ST is improved.

Furthermore, if the rotation torque applied from the worm gear 55A is suitably controlled corresponding to the various conditions of the traveling conditions and the like, then for example at the time of high speed traveling, by eliminating or minimizing the application of rotation torque, the operation of the handle 60 can be made heavy so that straight line traveling ability is increased. Alternatively, in the case where the handle 60 is operated at low speed such as at the time of in line parking, by increasing the rotational torque, the operation can be lightened and steering ability improved.

Figure 15:
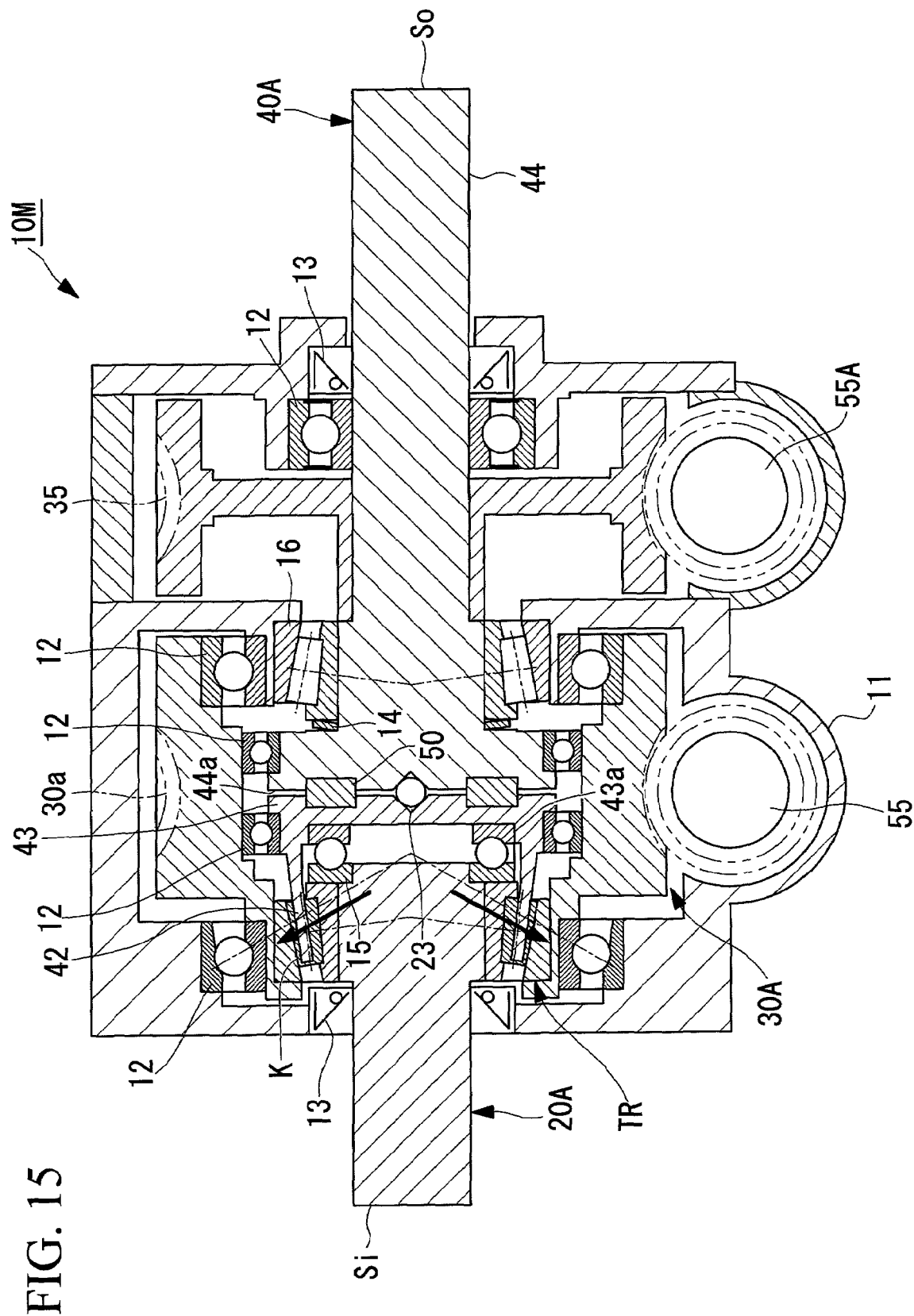
FIG. 15 is cross-section showing a first modified example of the traction drive transmission device of FIG. 14.

Next is a description of a first modified example of the transmission device according to the fourth embodiment, based on FIG. 15. Components the same as for the abovementioned embodiment are denoted by the same reference symbols, and their detailed description is omitted.

In a transmission device 10M described by this modified example, the point where this is different to the aforementioned embodiment is that an inner ring 20A provided with the input shaft Si is integrally constructed, a retainer 40A provided with the output shaft So is of a two piece construction, with the load regulation cam 50 arranged between the matching faces, and the worm gear 55 of the transmission ratio variation mechanism is connected to an outer ring 30A, and a worm gear 55A of a transmission torque assisting mechanism is connected to an output shaft section of a retainer 40A.

That is to say, the retainer 40A furnished with the output shaft So, is of a two piece construction with a retainer main body 43 and an output shaft portion 44 separated, and tapered roller rolling bodies K are provided in the comb shape rolling body retaining portion 42 provided on the retainer main body 43. Furthermore, the load regulation cam 50 which functions as the aforementioned preload adjusting part, is arranged between the opposing faces 43a and 44a of the retainer main body 43 and the output shaft portion 44.

Moreover the rolling bodies K are arranged between the inner ring 20 provided with the input shaft Si, and an outer ring 30A, so that a preload (shown by the arrow in the figure) acts, and torque transmission is performed by traction, and between an inner ring 20A and the retainer 40A, a thrust bearing 15 is provided so that relative rotation is possible. Furthermore, the worm gear 55 of the transmission ratio variation mechanism is meshed with a gear portion 30a formed on the outer peripheral face of the outer ring 30A, and the worm gear 55A of the transmission torque assisting mechanism is meshed with a gear portion 35 attached to the output shaft portion 44. Reference symbol 12 in the figure denotes a bearing, 13 denotes an oil seal, 14 denotes a plate spring, and 16 denotes a tapered roller bearing.

In the transmission device 10M of such a construction, the torque of the inner ring 20A which becomes the input shaft Si, is transmitted to the output shaft portion 44 which becomes the output shaft So of the retainer 40A via the rolling bodies K disposed in the rolling body retaining portion 42. At this time, in the retainer 40A which becomes the output shaft So, the load regulation cam 50 adjusts the preload acting on the rolling bodies K corresponding to the torque of the input shaft Si. Therefore when there is no input torque, the preload can be kept to a minimum. The preload in this case is adjusted by the load regulation cam 50, and is produced by a thrust load from the retainer main body 43 acting on the thrust bearing 15.

Furthermore, since the worm gear 55 of the transmission ratio variation mechanism is connected to the gear portion 30a of the outer ring 30A of the traction input-output member, and performs differential rotation control, the transmission ratio of the input/output shafts can be changed. Moreover, since the worm gear 55 of the transmission torque assisting mechanism is connected to the gear portion 35 which rotates as one with the output shaft portion 44 and applies a desired rotational torque, the transmission torque output from the output shaft So can be increased.

Furthermore, the transmission device 10M of the above construction has the advantage in that the rotation directions of the input/output shafts become the same. Moreover, when compared under the same conditions, in particular since the face pressure on the rolling bodies K can be kept rather low, this is advantageous from the aspect of life and durability.

Figure 16:
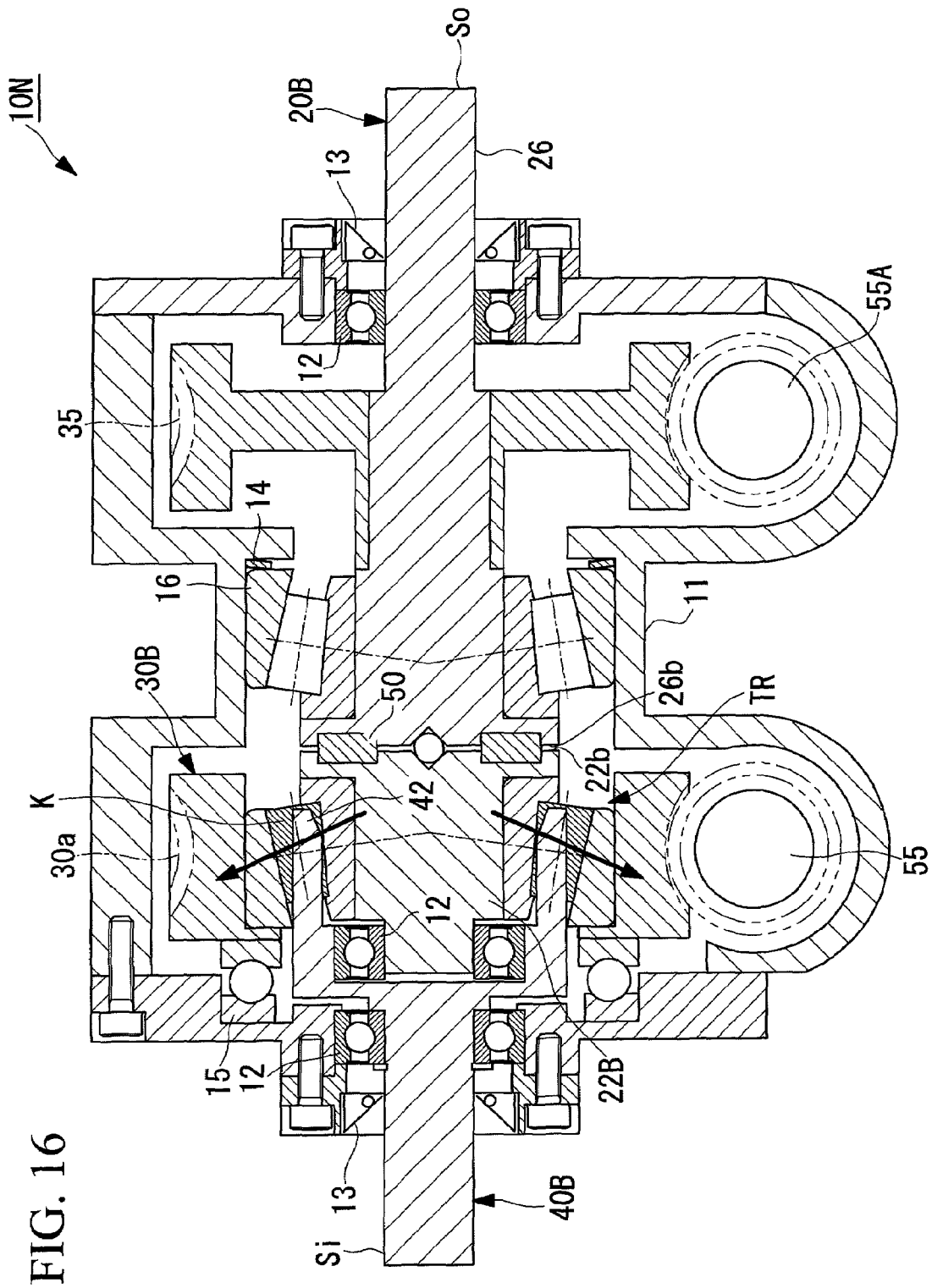
FIG. 16 is cross-section showing a second modified example of the traction drive transmission device of FIG. 14.

Next is a description of a second modified example of the transmission device according to the fourth embodiment, based on FIG. 16. Components the same as for the above-mentioned embodiment are denoted by the same reference symbols, and their detailed description is omitted.

In the transmission device 10N described by this modified example, the construction is such that the comb shape rolling body retaining portion 42 is provided on a retainer 40B which is furnished with the input shaft Si, the rolling bodies K disposed in the rolling body retaining portion 42 are arranged between an inner ring portion 20B provided with the output shaft So, and the outer ring 30B, and the load regulation cam 50 serving as the preload adjusting means, is provided on the inner ring 20B, and together with this, a worm gear 55 serving as a transmission ratio variation mechanism is connected to the outer ring 30B, and a worm gear 55A of a transmission torque assisting mechanism is connected to an output shaft section (the later described output shaft portion 26) of an inner ring 20B. Reference symbol 12 in the figure denotes a bearing, 13 denotes an oil seal, 14 denotes a plate spring, 15 denotes a thrust bearing, and 16 denotes a tapered roller bearing.

The inner ring 20B in this case is divided into two, namely an inner ring portion 22B and an output shaft portion 26, and between the opposing faces 22b and 26b of the inner ring portion 22B and the output shaft portion 26 is disposed the load regulation cam 50.

In the transmission device 10N of such a construction, the torque of the retainer 40B which becomes the input shaft Si, is transmitted to the inner ring portion 22B of the inner ring 20B which becomes the output shaft So, via the rolling bodies K disposed in the rolling body retaining portion 42. At this time, in the inner ring 20B, the load regulation cam 50 adjusts the preload acting on the rolling bodies K corresponding to the torque of the input shaft Si. Therefore when there is no input torque, the preload can be kept to a minimum. Furthermore, since the worm gear 55 of the transmission ratio variation mechanism is connected to the gear portion 30a which is formed on the outer ring 30B of the traction input-output member, and performs differential rotation control, the transmission ratio of the input/output shafts can be changed.

Moreover, since the worm gear 55A of the transmission torque assisting mechanism is connected to the gear portion 35 which rotates as one with the output shaft portion 26 of the inner ring 20B, and applies a desired rotational torque, the transmission torque output from the output shaft So can be increased.

Furthermore, not only does the transmission device 10N of the above construction have the advantage that the rotation directions of the input/output shafts become the same, but the number of necessary bearings can be reduced, so that assembly during production is simplified. In particular, when compared under the same conditions, this can operate in a range where the number of revolutions of the worm gear 55 is low. Therefore the operating noise can be kept down.

Figure 17:
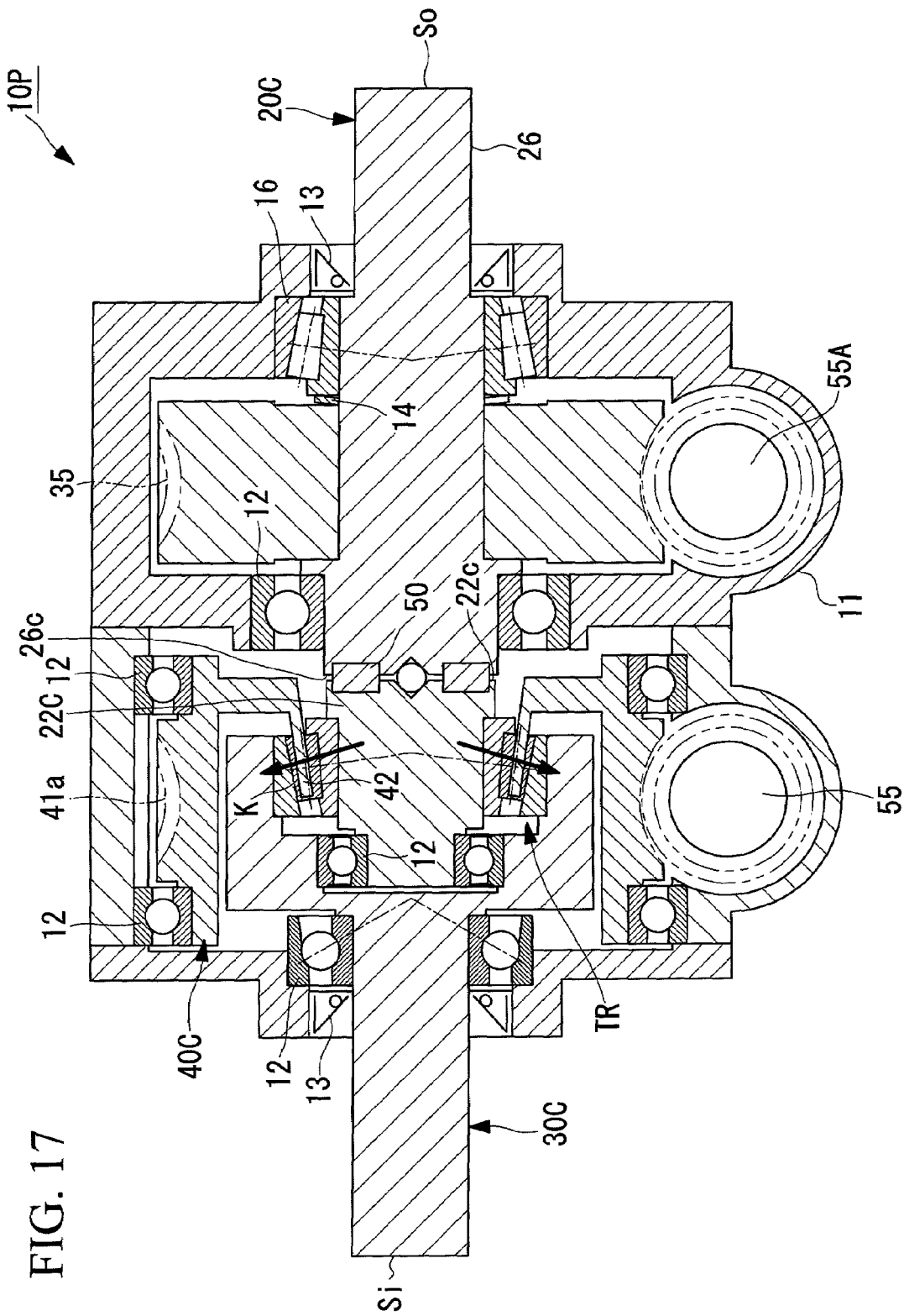
FIG. 17 is cross-section showing a third modified example of the traction drive transmission device of FIG. 14.

Next is a description of a third modified example of the transmission device according to the fourth embodiment, based on FIG. 17. Components the same as for the above-mentioned embodiment are denoted by the same reference symbols, and their detailed description is omitted.

In the transmission device 10P described by this modified example, the construction is such that the comb shape rolling body retaining portion 42 is provided on a retainer 40C, the rolling bodies K disposed in the rolling body retaining portion 42 are arranged between an inner ring portion 20C of a two piece construction provided with the output shaft So, and the outer ring 30C provided with the input shaft Si, and the load regulation cam 50 serving as the preload adjusting part, is provided between the opposing faces of the inner ring 20C, and together with this, a worm gear 55 serving as a transmission ratio variation mechanism is connected to the retainer 40C, and a worm gear 55A of a transmission torque assisting mechanism is connected to an output shaft section (the later described output shaft portion 26) of an inner ring 20C. Reference symbol 12 in the figure denotes a bearing, 13 denotes an oil seal, 14 denotes a plate spring, and 16 denotes a tapered roller bearing.

In this case, the inner ring 20C is divided into two, namely an inner ring portion 22C and an output shaft portion 26, and on the opposing faces 22c and 26c of the inner ring portion 22C and the output shaft portion 26 is disposed the load regulation cam 50.

In the transmission device 10P of such a construction, the torque of the output shaft 30C which becomes the input shaft Si, is transmitted to the inner ring portion 22C of the inner ring 20C which becomes the output shaft So, via the rolling bodies K disposed in the rolling body retaining portion 42. At this time, in the inner ring 20C which becomes the output shaft So, the preload cam 50 adjusts the preload acting on the rolling bodies K corresponding to the torque of the input shaft Si. Therefore when there is no input torque, the preload can be kept to a minimum. Furthermore, since the worm gear 55 of the transmission ratio variation mechanism is connected to the gear portion 41a formed on the retainer 40C of the traction input-output member, and performs differential rotation control, the transmission ratio of the input/output shafts can be changed.

Moreover, since the worm gear 55A of the transmission torque assisting mechanism is connected to the gear portion 35 which rotates as one with the output shaft portion 26 of the inner ring 20C, and applies a desired rotational torque, the transmission torque output from the output shaft So can be increased.

Furthermore, regarding the transmission device 10P of the above construction, when compared under the same conditions, this can operate in a range where the number of revolutions of the worm gear 55 is comparatively low. Therefore the operating noise can be kept down.

Fifth Embodiment

Next is a description of a fifth embodiment of a transmission device according to the present invention, based on the drawings. In the embodiment described hereunder, the input/output of the abovementioned traction drive transmission is connected in two sets to give a two stage transmission configuration which carries out transmission which is inverse to the transmission in a first stage, in a second stage. Components the same as for the abovementioned embodiment are denoted by the same reference symbols, and their detailed description is omitted.

Figure 18:
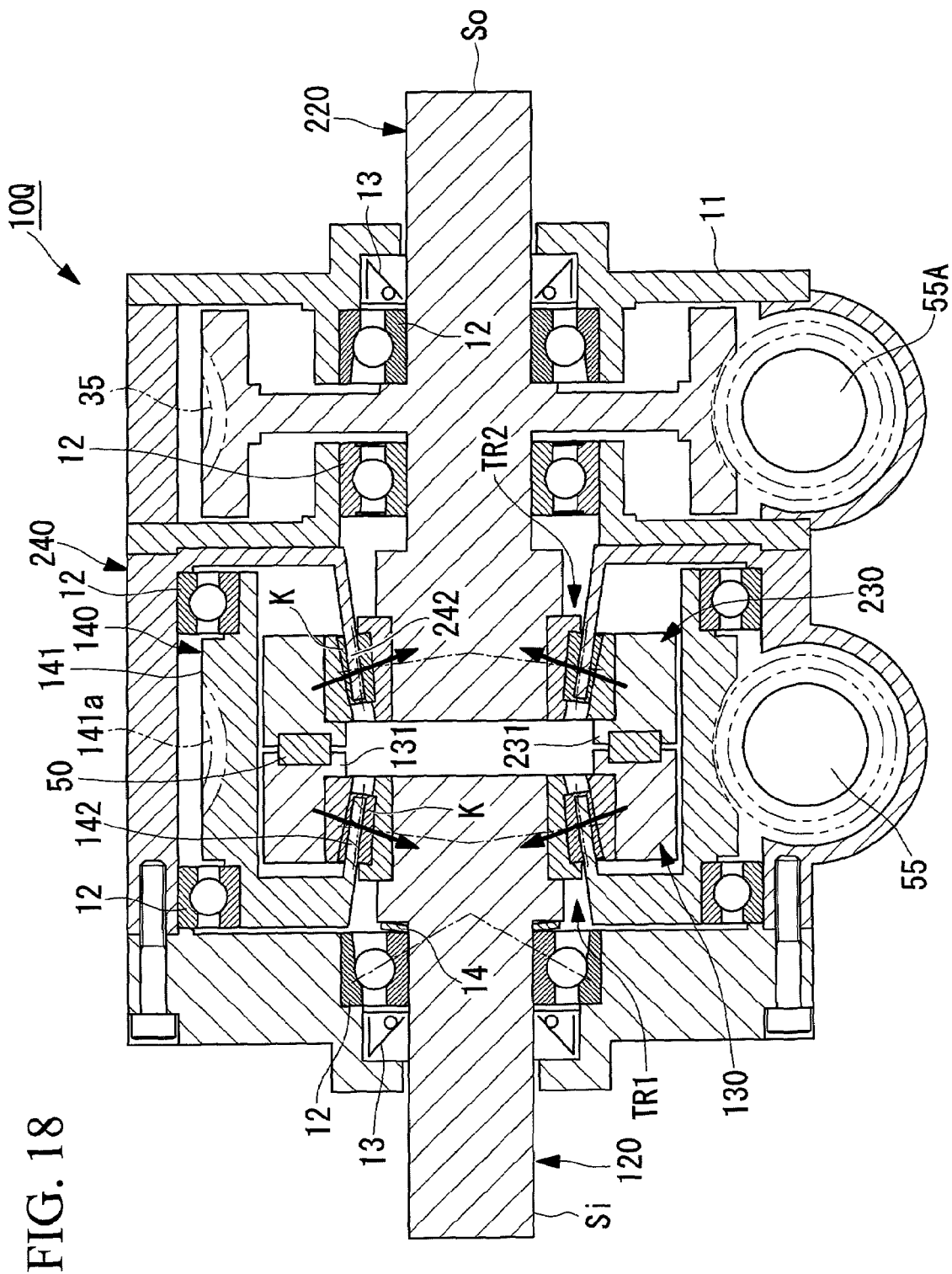
FIG. 18 is a cross-section showing a fifth embodiment of a traction drive transmission device according to the present invention.

A transmission device 10Q of this embodiment shown in FIG. 18 is constructed so that the traction of rolling bodies K arranged between an input shaft Si and an output shaft So is used to change the number of revolutions of the input shaft Si into a desired transmission ratio, and output from the output shaft So, and the input shaft Si and the output shaft So are connected in left/right symmetry to perform two stage transmission.

The input shaft Si and the output shaft So which protrude to opposite sides of the housing 11, are shaft members provided on the inner ring of a first stage transmission section TR1 and a second stage transmission section TR2 which are connected so as to have substantially left/right symmetry in the axial direction.

The first stage transmission section TR1 is constructed such that a comb shape rolling body retaining portion 142 is provided in a main body 141 of a first retainer 140, and rolling bodies K disposed in the rolling body retaining portion 142 are arranged between a first inner ring 120 provided with the input shaft Si, and a first outer ring 130 provided with a connection output shaft 131. Also in this case, the rolling body retaining portion 142 is not limited to a comb shape, and a ladder shape or the like may be suitably selected.

The second stage transmission section TR2 is constructed such that a comb shape rolling body retaining portion 242 is provided in a main body portion (part of the housing 11) of a second retainer 240, and rolling bodies K disposed in the rolling body retaining portion 242 are arranged between a second inner ring 220 provided with the output shaft So, and a second outer ring 230 provided with a connection input shaft 231. Also in this case, the rolling body retaining portion 242 is not limited to a comb shape, and a ladder shape or the like may be suitably selected.

The abovementioned rolling bodies K are arranged at an incline so that their rolling axis is not orthogonal to the axis of the input shaft Si and the output shaft So, for either of the first stage transmission section TR1 and the second stage transmission section TR2.

On the shaft connection portion where the end portion end faces of the connection output shaft 131 of the first stage transmission section TR1 and the connection input shaft 231 of the second stage transmission section TR2 are connected facing each other, is provided a load regulation cam 50 which functions as a preload adjusting part. This load regulation cam 50, similarly to the aforementioned first embodiment, is accommodated inside a space of recess portions formed between the opposing faces of the shaft connecting portion, in a condition where it can roll and slide thereinside. These recess portions are provided as a plurality of sets radiating from the axial center so as to have the same pitch around the circumferential direction. The number thereof may be appropriately selected corresponding to various conditions.

Moreover, the first retainer 140 is furnished with a gear portion 141a formed on the outer peripheral face of the main body 141. This gear portion 141a is meshed with a worm gear 55 which functions as a transmission ratio variation mechanism. That is to say, in this construction, the traction drive structure described for the first embodiment is one where the input/output shafts are assembled so as to be in left/right symmetry.

Furthermore, on the second inner ring 220 furnished with the output shaft So is provided a gear portion 35 which rotates as one therewith. This gear portion 35 is meshed with the worm gear 55A of the transmission torque assisting mechanism, and has a function for applying a desired rotation torque from the worm gear 55A to the output shaft So to increase the output transmission torque. The second retainer 240 is an immovable member which is fixed to the housing 11 and forms one portion thereof. Reference symbol 12 in the figure denotes a bearing, 13 denotes an oil seal, and 14 denotes a plate spring.

According to this transmission device 10Q, in the first stage transmission section TR1, the torque of the first inner ring 120 which becomes the input shaft Si, is transmitted via the rolling bodies K which are disposed in the rolling body retaining portion 142 of the first retainer 140, to the first outer ring 130 furnished with the connection output shaft 131, by means of traction drive. Subsequently, in the second stage transmission section TR2, the torque is transmitted via the load regulation cam 50 which functions as a preload adjusting part, to the second outer ring 230 provided with the connection input shaft 231, and is transmitted to the second inner ring 220 which becomes the output shaft So, via the rolling bodies K disposed in the rolling body retaining portion 242 of the second retainer 240.

At this time, in the shaft connection portion which connects between the connection output shaft 131 and the connection input shaft 231 via the load regulation cam 50, the load regulation cam 50 adjusts the preload acting on the rolling bodies of the first stage transmission section and the second stage transmission section, corresponding to the torque of the connection output shaft 131. Therefore, when there is no input torque, this can be suppressed to a minimum preload stipulated by the plate spring 14. Furthermore, the worm gear 55 of the transmission ratio variation mechanism is connected to the gear portion 141a formed on the first retainer 140 of the traction input-output member, and performs differential rotation control. Therefore, the transmission ratio of the input/output shafts can be changed to a desired value.

Furthermore, in the transmission device 10Q of such a construction, the worm gear 55A of the transmission torque assisting mechanism is connected to the gear portion 35 which rotates as one with the second inner ring 220 furnished with the output shaft So. Therefore a desired rotation torque corresponding to the rotation of the worm gear 55A is applied to the output shaft So, and hence the transmission torque output from the output shaft So can be increased.

Furthermore, after the transmission with the first stage transmission section TR1, the transmission device 10Q of the above construction performs transmission in the opposite direction with the second stage transmission section TR2. Therefore, for example after stepping-up with the first stage transmission section TR1, this is stepped down with the second stage transmission section TR2, and the input/output relationship due to the micro traction becomes 1:1. Therefore, in the case where this device is assembled into a vehicle steering apparatus ST, it can be used with a present state rack and pinion 64 without change.

Furthermore, regarding the abovementioned transmission device 10Q, when compared under the same conditions, this can operate in a range where the number of revolutions of the worm gear 55 is particularly low. Therefore the operating noise can be kept down. Furthermore, since the number of bearings used is few, this has the advantage in that assembly is simple.

Figure 19:
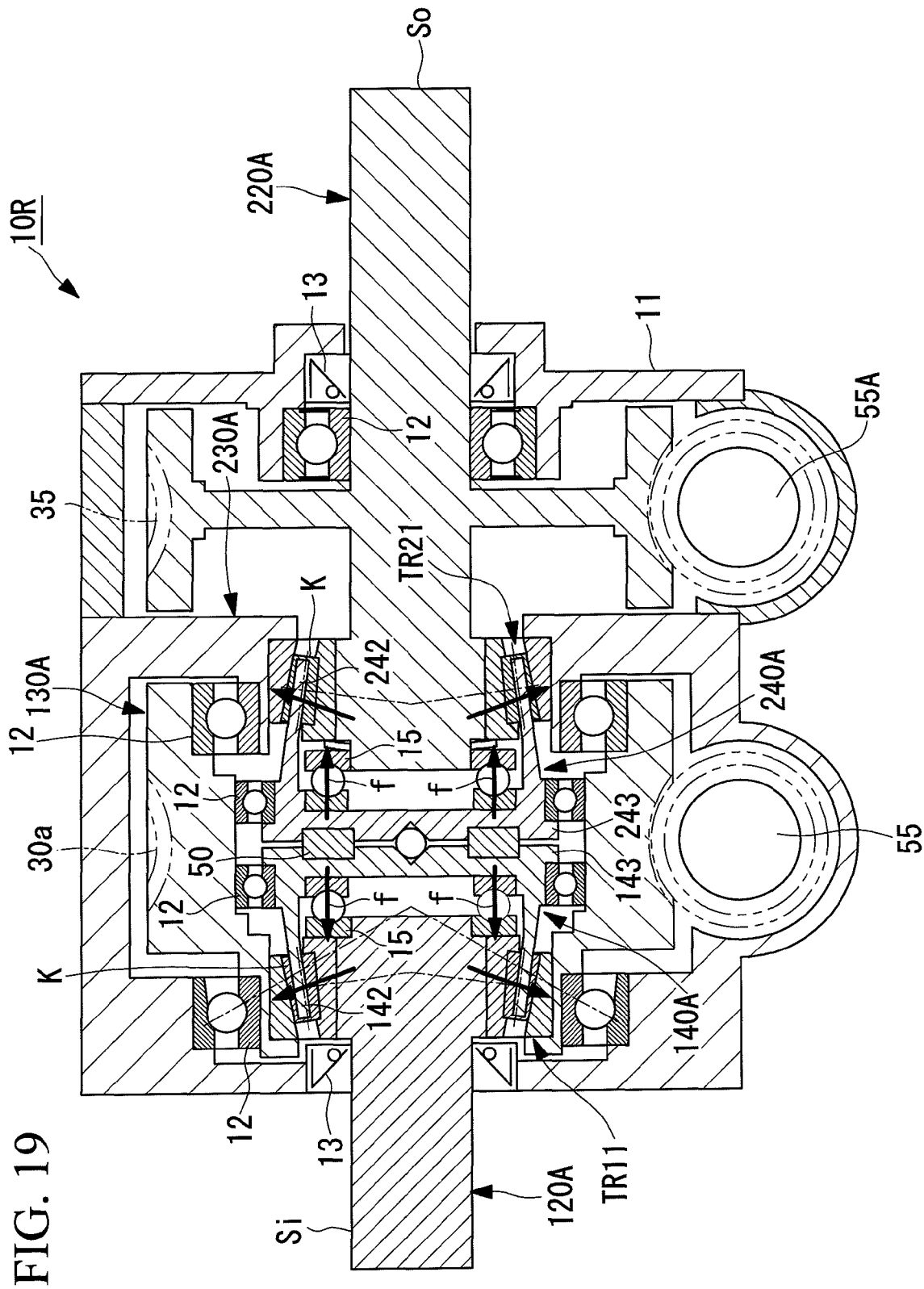
FIG. 19 is cross-section showing a first modified example of the traction drive transmission device of FIG. 18.

Next is a description of a first modified example of the transmission device according to the fifth embodiment, based on FIG. 19. Components the same as for the abovementioned embodiment are denoted by the same reference symbols, and their detailed description is omitted.

In the transmission device 10R described by this modified example, there is provided: a first stage transmission section TR11 with a comb shape rolling body retaining portion 142 provided on a first retainer 140A provided with a connection output shaft 143, with rolling bodies K disposed in this rolling body retaining portion 142, arranged between a first inner ring 120A provided with the input shaft Si, and a first outer ring 130A; and a second stage transmission section TR21 with a comb shape rolling body retaining portion 242 provided on a second retainer 240A provided with a connection input shaft 243, with rolling bodies K disposed in this rolling body retaining portion 242, arranged between a second inner ring 220A provided with the output shaft So, and a second outer ring (fixed as one to the housing 11).

Furthermore, the construction is such that a load regulation cam 50 which functions as a preload adjusting part, is provided on a shaft connection portion of the connection output shaft 143 and the connection input shaft 243, and together with this, a worm gear 55 of a transmission ratio variation mechanism is connected to a gear portion 30a formed on the first outer ring 130A. That is to say, this construction is one where the traction drive mechanism of the first modified example described for the fourth embodiment is assembled so that the input/output shafts have left/right symmetry.

Furthermore, on the second inner ring 220A which becomes the output shaft So, is provided a gear portion 35 which rotates as one therewith, and the worm gear 55A which functions as the aforementioned transmission torque assisting mechanism is meshed with the gear portion 35.

According to this transmission device 10R, in the first stage transmission section TR11, the torque of the first inner ring 120A which becomes the input shaft Si, is transmitted via the rolling bodies K which are disposed in the rolling body retaining portion 142 of the first retainer 140A, to the first retainer 140A furnished with the connection output shaft 143, by means of traction drive. Subsequently, in the second stage transmission section TR21, the torque transmitted via the load regulation cam 50 which functions as a preload adjusting part, to the second retainer 240A which becomes the connection input shaft 243, is transmitted to the second inner ring 220A which becomes the output shaft So by traction drive, via the rolling bodies K disposed in the rolling body retaining portion 242 of the second retainer 240A.

At this time, in the shaft connection portion which connects between the connection output shaft 143 and the connection input shaft 243 via the load regulation cam 50, the load regulation cam 50 adjusts the preload acting on the rolling bodies K of the first stage transmission section TR11 and the second stage transmission section TR21, corresponding to the torque of the connection output shaft 143. Therefore, when there is no input torque, the preload can be suppressed to a minimum.

Furthermore, the worm gear 55 of the transmission ratio variation mechanism is connected to the gear portion 30a formed on the first outer ring 130A of the traction input-output member, and performs differential rotation control. Therefore, the transmission ratio of the input/output shafts can be changed to a desired value.

Moreover, since the worm gear 55A of the transmission torque assisting mechanism is connected to the output shaft So, and applies a desired rotation force, the transmission torque output from the output shaft So can be increased.

Furthermore, after the transmission with the first stage transmission section TR11, the transmission device 10R of such a construction performs transmission in the opposite direction with the second stage transmission section TR21. Therefore, for example after stepping-up with the first stage transmission section TR11, this is stepped down with the second stage transmission section TR21, and the input/output relationship due to the micro traction becomes 1:1. Therefore, in the case where this device is assembled into a vehicle steering apparatus ST, it can be used with a present state rack and pinion 64 without change.

Furthermore, regarding the transmission device 10R of the above construction, when compared under the same conditions, this can operate in a range where the number of revolutions of the worm gear 55 is comparatively low. Therefore the operating noise can be kept down.

Figure 20:
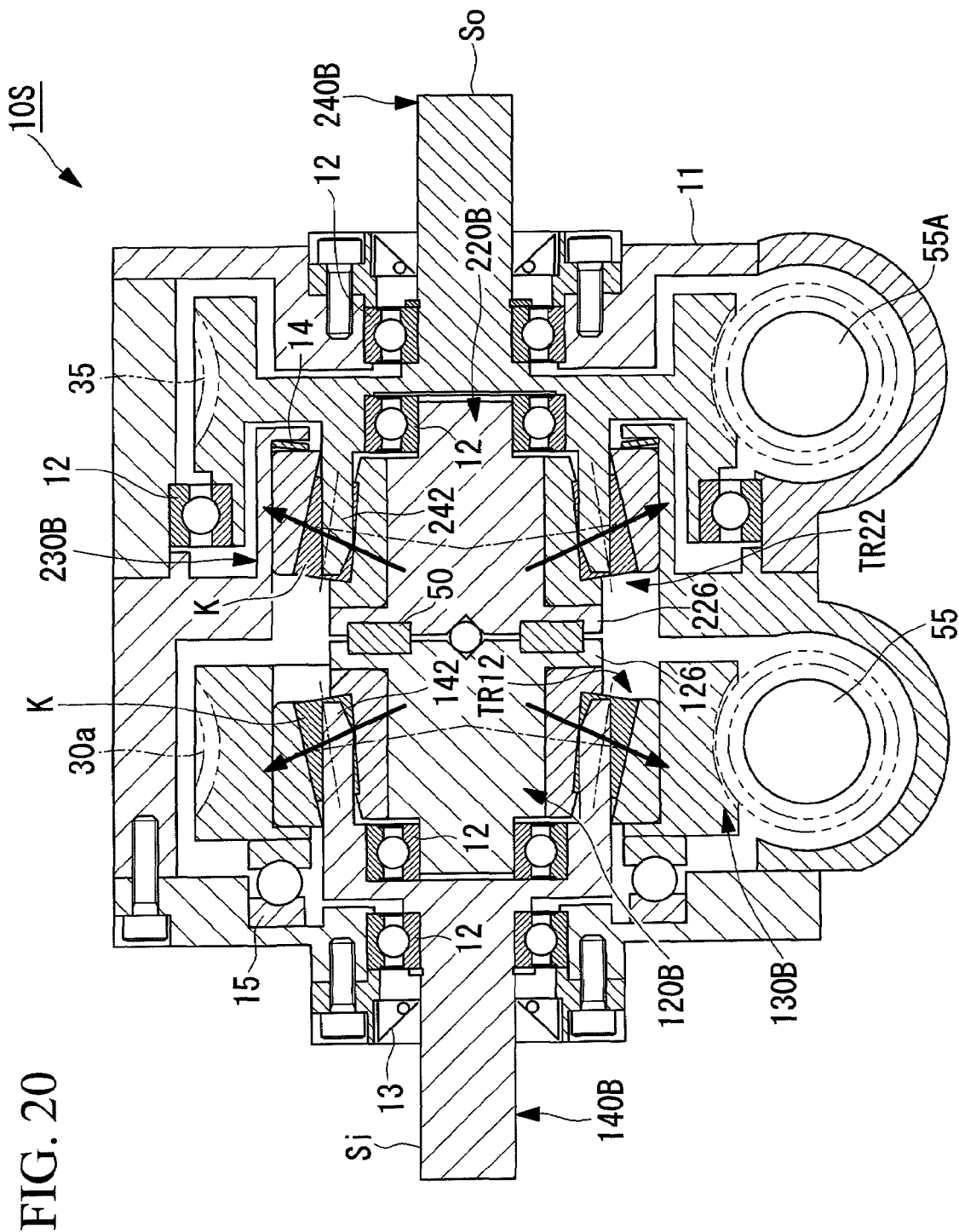
FIG. 20 is cross-section showing a second modified example of the traction drive transmission device of FIG. 18.

Next is a description of a second modified example of the transmission device according to the fifth embodiment, based on FIG. 20. Components the same as for the abovementioned embodiment are denoted by the same reference symbols, and their detailed description is omitted.

In the transmission device 10S described by this modified example, there is provided: a first stage transmission section TR12 with a comb shape rolling body retaining portion 142 provided on a first retainer 140B provided with an input shaft Si, with rolling bodies K disposed in this rolling body retaining portion 142, arranged between a first inner ring 120B provided with a connection output shaft 126, and a first outer ring 130B; and a second stage transmission section TR22 with a comb shape rolling body retaining portion 242 provided on a second retainer 240B provided with an output shaft So, with rolling bodies K disposed in this rolling body retaining portion 242, arranged between a second inner ring 220B provided with a connection input shaft 226, and a second outer ring fixed as one to the housing 11.

Furthermore, the construction is such that a load regulation cam 50 which functions as a preload adjusting part, is provided on a shaft connection portion of the connection output shaft 126 and the connection input shaft 226, and together with this, a worm gear 55 which functions as a transmission ratio variation mechanism is connected to a gear portion 30a formed on the first outer ring 130B. That is to say, this construction is one where the traction drive mechanism of the second modified example described for the fourth embodiment is assembled so that the input/output shafts have left/right symmetry.

Furthermore, on the second retainer 240B which becomes the output shaft So, is provided a gear portion 35 which rotates as one therewith, and the worm gear 55A which functions as the aforementioned transmission torque assisting mechanism is meshed with the gear portion 35.

According to this transmission device 10S, in the first stage transmission section TR12, the torque of the first retainer 140B which becomes the input shaft Si, is transmitted via the rolling bodies K which are disposed in the rolling body retaining portion 142 of the first retainer 140B, to the first inner ring 120B furnished with the connection output shaft 126.

Subsequently, in the second stage transmission section TR22, the torque is transmitted via the load regulation cam 50 which functions as a preload adjusting part, to the second inner ring 220B furnished with the connection input shaft 226. Furthermore the torque is transmitted to the second retainer 240B which becomes the output shaft So, via the rolling bodies K disposed in the rolling body retaining portion 242 of the second retainer 240B.

At this time, in the shaft connection portion which connects between the connection output shaft 126 and the connection input shaft 226 via the load regulation cam 50, the load regulation cam 50 adjusts the preload acting on the rolling bodies K of the first stage transmission section TR12 and the second stage transmission section TR22, corresponding to the torque of the connection output shaft 126. Therefore, when there is no input torque, the preload can be suppressed to a minimum.

Furthermore, the worm gear 55 of the transmission ratio variation mechanism is connected to the gear portion 30a formed on the first outer ring 130B of the traction input-output member, and performs differential rotation control. Therefore, the transmission ratio of the input/output shafts can be changed to a desired value.

Moreover, since the worm gear 55A of the transmission torque assisting mechanism is connected to the output shaft So, and applies a desired rotation force, the transmission torque output from the output shaft So can be increased.

Furthermore, after the transmission with the first stage transmission section TR12, the transmission device 10S of such a construction performs transmission in the opposite direction with the second stage transmission section TR22. Therefore, for example after stepping-up with the first stage transmission section TR12, this is stepped down with the second stage transmission section TR22, and the input/output relationship due to the micro traction becomes 1:1. Therefore, in the case where this device is assembled into a vehicle steering apparatus ST, it can be used with a present state rack and pinion 64 without change.

Moreover, regarding the aforementioned transmission device 10S, since the number of bearings is comparatively small, assembly is simplified. Moreover, when compared under the same conditions, in particular since the face pressure on the rolling bodies K can be kept low, and also the transmission torque of the input shaft Si provided with the load regulation cam 50 can be set low, this is advantageous from the aspect of life and durability.

Figure 21:
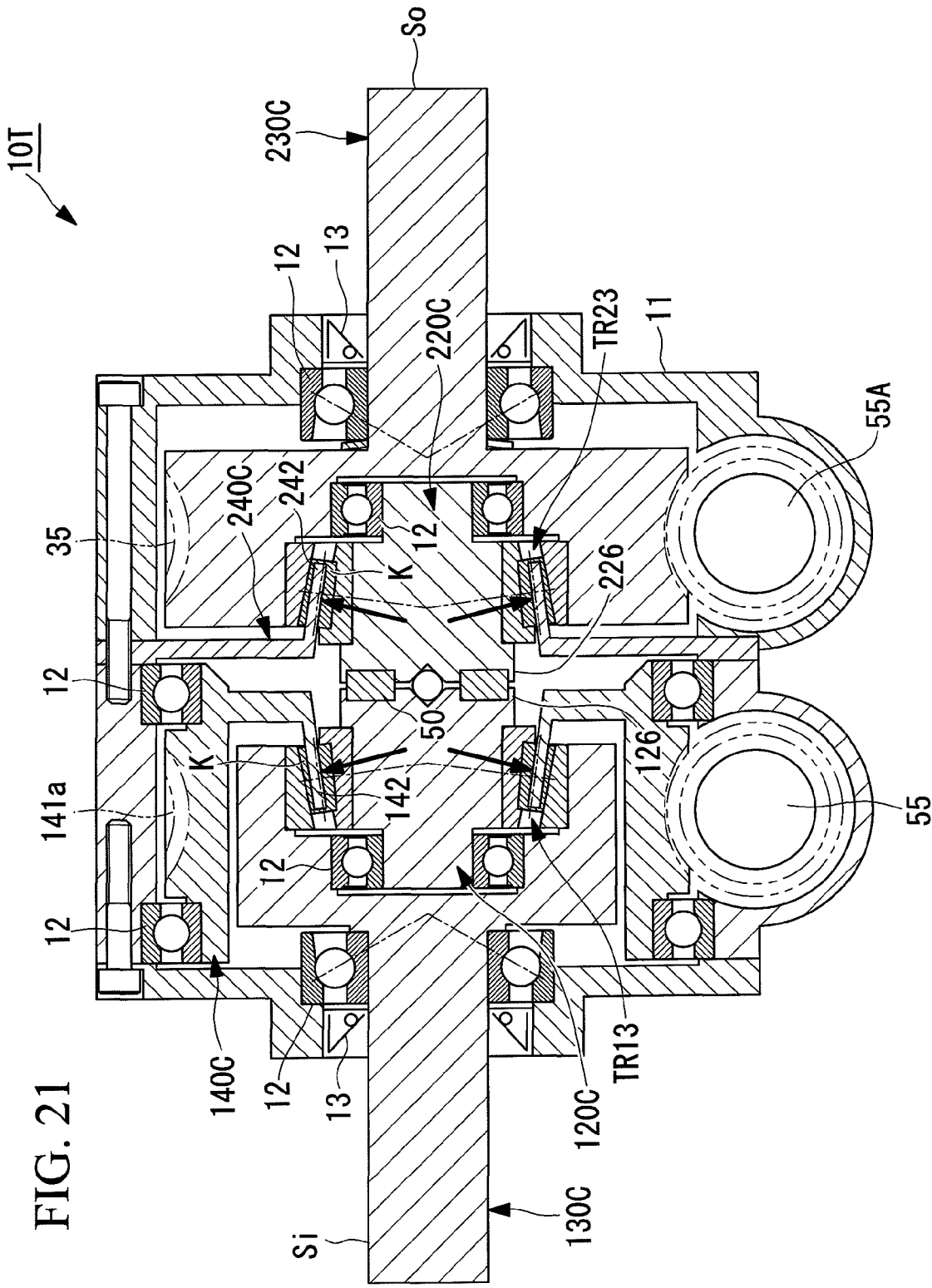
FIG. 21 is cross-section showing a third modified example of the traction drive transmission device of FIG. 18.

Next is a description of a third modified example of the transmission device according to the fifth embodiment, based on FIG. 21. Components the same as for the abovementioned embodiment are denoted by the same reference symbols, and their detailed description is omitted.

In the transmission device 10T described by this modified example, there is provided: a first stage transmission section TR13 with a comb shape rolling body retaining portion 142 provided on a first retainer 140C, with rolling bodies K disposed in this rolling body retaining portion 142, arranged between a first inner ring 120C provided with a connection output shaft 126, and a first outer ring 130C provided with an input shaft Si; and a second stage transmission section TR23 with a comb shape rolling body retaining portion 242 provided on a second retainer 240C, with rolling bodies K disposed in this rolling body retaining portion 242, arranged between a second inner ring 220C provided with a connection input shaft 226, and a second outer ring 230C provided with an output shaft So.

Furthermore, the construction is such that a load regulation cam 50 which functions as a preload adjusting part, is provided on a shaft connection portion of the connection output shaft 126 and the connection input shaft 226, and together with this, a worm gear 55 which functions as a transmission ratio variation mechanism is connected to a gear portion 141a formed on the first retainer 140C. That is to say, this construction is one where the traction drive mechanism of the third modified example described for the fourth embodiment is assembled so that the input/output shafts have left/right symmetry.

Moreover, on the second outer ring 230A which becomes the output shaft So, is provided a gear portion 35 which rotates as one therewith, and the worm gear 55A which functions as the aforementioned transmission torque assisting mechanism is meshed with the gear portion 35.

According to this transmission device 10T, in the first stage transmission section TR13, the torque of the first outer ring 130C which becomes the input shaft Si, is transmitted via the rolling bodies K which are disposed in the rolling body retaining portion 142 of the first retainer 140C, to the first inner ring 120C furnished with the connection output shaft 126. Subsequently, in the second stage transmission section TR23, the torque transmitted via the load regulation cam 50 which functions as a preload adjusting means, to the second inner ring 220C furnished with the connection input shaft 226, is transmitted to the second outer ring 230C which becomes the output shaft So, via the rolling bodies K disposed in the rolling body retaining portion 242 provided on the immovable second retainer which is fixed to the housing 11 and forms one portion thereof.

At this time, in the shaft connection portion which connects between the connection output shaft 126 and the connection input shaft 226 via the load regulation cam 50, the load regulation cam 50 adjusts the preload acting on the rolling bodies K of the first stage transmission section TR13 and the second stage transmission section TR23, corresponding to the torque of the connection output shaft 126. Therefore, when there is no input torque, the preload can be suppressed to a minimum.

Furthermore, the worm gear 55 of the transmission ratio variation mechanism is connected to the gear portion 141a formed on the first retainer 140C of the traction input-output member, and performs differential rotation control. Therefore, the transmission ratio of the input/output shafts can be changed to a desired value.

Moreover, since the worm gear 55A of the transmission torque assisting mechanism is connected to the output shaft So, and applies a desired rotation force, the transmission torque output from the output shaft So can be increased.

Furthermore, after the transmission with the first stage transmission section TR13, the transmission device 10T of such a construction performs transmission in the opposite direction with the second stage transmission section TR23. Therefore, for example after stepping-up with the first stage transmission section TR13, this is stepped down with the second stage transmission section TR23, and the input/output relationship due to the micro traction becomes 1:1. Therefore, in the case where this device is assembled into a vehicle steering apparatus ST, it can be used with a present state rack and pinion 64 without change.

Furthermore, regarding the aforementioned transmission device 10G, when compared under the same conditions, since the face pressure on the rolling bodies K can be kept low, and also the transmission torque of the input shaft Si provided with the load regulation cam 50 can be set low, this is advantageous from the aspect of life and durability. Furthermore, this can operate in a range where the number of revolutions of the worm gear 55 is comparatively low. Therefore the operating noise can be kept down.

As described above, in the transmission device shown for the fourth embodiment of the present invention, the rotation axis of the rolling bodies K is arranged at an incline so that it is not orthogonal to the axis of the input shaft Si and the output shaft So. Moreover there is provided: the load regulation cam 50 of the preload adjusting part which automatically changes the preload applied to the rolling bodies K corresponding to the torque of the input shaft Si; the worm gear 55 of the differential type transmission ratio variation mechanism which performs number of revolutions control of the traction input-output member to change the transmission ratio, connected to the traction input-output member of the rolling bodies K; and the worm gear 55A of the transmission torque assisting mechanism which applies a turning force to the output shaft So to increase the transmission torque. Therefore the preload applied to the rolling bodies K provided at an incline, is adjusted by the load regulation cam 50 corresponding to the torque of the input shaft Si. That is to say, the load regulation cam 50 produces a thrust load corresponding to the transmission torque, and this thrust load becomes a preload pressing the rolling bodies K in the axial direction.

Furthermore, since the differential transmission ratio variation mechanism is provided, the transmission ratio of the input/output shafts can be adjusted and optionally set. Moreover, since a turning force can be applied to the output shaft So by the transmission torque assisting mechanism, the transmission torque output from the output shaft So can also be increased.

Moreover, in the reduction gear shown in the fifth embodiment of the present invention, the rotation axis of the rolling bodies K is arranged at an incline so that it is not orthogonal to the axis of input shaft Si and the output shaft So. Moreover there is provided: the load regulation cam 50 of the preload adjusting part which automatically changes the preload applied to the rolling bodies K corresponding to the torque between the shafts which connect the first stage transmission section and the second stage transmission section; the worm gear 55 of the transmission ratio variation mechanism which performs number of revolutions control of the traction input-output member to change the transmission ratio, connected to the traction input-output member of the rolling bodies K; and the worm gear 55A of the transmission torque assisting mechanism which applies a turning force to the output shaft So to increase the transmission torque. Therefore the preload applied to the rolling bodies K provided at an incline, is adjusted by the load regulation cam 50 which automatically changes the preload corresponding to the torque between the shafts which connect the first stage transmission section and the second stage transmission section.

Furthermore, since the differential type transmission ratio variation mechanism is provided, the transmission ratio of the input/output shafts can be adjusted and optionally set. Moreover, since a turning force can be applied to the output shaft So by the transmission torque assisting mechanism, the transmission torque output from the output shaft So can also be increased. In this case, since the two stage transmission is performed by the first stage transmission section and the second stage transmission section, the input/output relationship for the traction drive can be made 1:1 in the same rotation direction.

The present invention is not limited to the above described embodiments, and can be suitably changed within a scope which does not depart from the gist of the present invention.

The invention claimed is:

1. A traction drive transmission device, comprising:
rolling bodies arranged between an input shaft and an output shaft, the traction of said rolling bodies changing the number of revolutions of said input shaft into a desired transmission ratio and output from said output shaft, and said input shaft and output shaft connected in left/right symmetry to perform two stage transmissions, wherein
a first rolling body retaining portion extending between adjacent rolling bodies is provided on a first retainer provided with said input shaft,
a second rolling body retaining portion extending between adjacent rolling bodies is provided on a second retainer provided with said output shaft,
the input shaft, the first retainer and the first rolling body retaining portion are formed as a single part,
the output shaft, the second retainer and the second rolling body retaining portion are formed as a single part,
a rotation axis of said rolling bodies is arranged at an incline so that the rotation axis is not orthogonal to the axis of said input shaft and said output shaft, and
said traction drive transmission device further comprises:
a preload adjusting part for automatically changing a preload applied to said rolling bodies corresponding to a torque between shafts which connect a first stage transmission section and a second stage transmission section; and
a transmission ratio variation mechanism connected to a traction input-output member of said rolling bodies, for changing said transmission ratio by performing number of revolutions control of said traction input-output member,
wherein said preload adjusting part is one where, in a torque transmission structure which performs torque transmission between opposing faces of two members which are arranged so as to rotate on the same axes, recesses which form an incline face or curved face in cross-section are provided in a plurality of sets between said opposing faces, and a load regulation cam having a cylindrical shape is disposed in a space of said recesses.

2. A traction drive transmission device according to claim 1, further comprising:
a first stage transmission section with said rolling bodies which are supported by said first retainer furnished with said input shaft to be arranged between a first inner ring provided with a connection output shaft and a first outer ring; and
a second stage transmission section with said rolling bodies which are supported by said second retainer furnished with said output shaft to be arranged between a second inner ring provided with a connection input shaft and a second outer ring,
wherein
said preload adjusting part is provided on a shaft connection portion between said connection output shaft and said connection input shaft;
said transmission ratio variation mechanism is connected to said first outer ring; and
said second outer ring is fixed to a housing.

3. A traction drive transmission device according to claim 1, wherein said transmission ratio variation mechanism is a worm gear which is furnished with a drive source capable of rotation control.

4. A steering device for a vehicle wherein a steering operation of a driver is transmitted to a vehicle steering wheel via attraction drive transmission device according to claim 1.

5. A traction drive transmission device according to claim 1, wherein said first and second rolling body retaining portions are protruded straight from radially outer portions of the first and second retainers, respectively, so as to rotatably retain the rolling bodies thereon.

* * * * *